United States Patent
Murata

(10) Patent No.: US 7,423,776 B2
(45) Date of Patent: Sep. 9, 2008

(54) IMAGE OUTPUTTING DEVICE FROM MOBILE STORAGE MEDIUM

(75) Inventor: Kazuyuki Murata, Kyotanabe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 707 days.

(21) Appl. No.: 10/311,390

(22) PCT Filed: May 30, 2001

(86) PCT No.: PCT/JP01/04580

§ 371 (c)(1), (2), (4) Date: Dec. 13, 2002

(87) PCT Pub. No.: WO01/97004

PCT Pub. Date: Dec. 20, 2001

(65) Prior Publication Data

US 2003/0090695 A1    May 15, 2003

(30) Foreign Application Priority Data

Jun. 14, 2000    (JP)    ............................ 2000-178930

(51) Int. Cl.
*G06K 15/00*    (2006.01)
*G06F 3/12*    (2006.01)

(52) U.S. Cl. .................... 358/1.16; 358/1.15; 358/1.17; 358/1.2; 358/1.13

(58) Field of Classification Search ................ 358/1.15, 358/1.16, 1.18, 1.14, 1.13, 1.11, 1.9, 1.8, 358/1.7, 1.6, 1.5, 1.4, 1.3, 1.2, 1.1, 1.17, 358/407, 444, 468, 404; 347/2, 3, 5; 711/100
See application file for complete search history.

(56) References Cited

U.S. PATENT DOCUMENTS

| 5,708,512 | A  | * | 1/1998  | Ishizuka ..................... 358/449 |
| 5,717,506 | A  |   | 2/1998  | Yamamoto et al. |
| 5,900,639 | A  | * | 5/1999  | Peters ..................... 250/559.4 |
| 6,078,404 | A  | * | 6/2000  | Natsume et al. .............. 358/1.2 |
| 6,111,659 | A  | * | 8/2000  | Murata ....................... 358/296 |
| 6,124,944 | A  | * | 9/2000  | Ohta .......................... 358/1.9 |
| 6,421,135 | B1 | * | 7/2002  | Fresk et al. ................ 358/1.15 |
| 6,456,391 | B1 | * | 9/2002  | Miyamoto et al. ......... 358/1.18 |
| 6,650,437 | B1 | * | 11/2003 | Nakajima ................... 358/1.9 |
| 6,791,703 | B1 | * | 9/2004  | Maeda et al. .............. 358/1.15 |

FOREIGN PATENT DOCUMENTS

JP    01204428    *    7/1989

(Continued)

*Primary Examiner*—Dov Popovici
(74) *Attorney, Agent, or Firm*—Hamre, Schumann, Mueller & Larson, P.C.

(57) ABSTRACT

An image output apparatus capable of offline printing or displaying image and text data automatically and efficiently to a digital copying machine, a printer, a facsimile, a liquid crystal projector, and a television set. Discrimination is conducted as to whether data in a data file to be printed, which is read out from a memory card by a memory card controller, is color or monochrome image data. As a result of the discrimination, when the data is color image data, print confirmation unit provided in the image output apparatus allows a user to confirm whether or not to print out monochrome image data, which is converted from the color image data by the color/monochrome conversion unit.

14 Claims, 30 Drawing Sheets

FOREIGN PATENT DOCUMENTS

| | | |
|---|---|---|
| JP | 2-185463 | 7/1990 |
| JP | 3-68275 | 3/1991 |
| JP | 6-8537 | 1/1994 |
| JP | 7-222012 | 8/1995 |
| JP | 7-271533 | 10/1995 |
| JP | 8-324053 | 12/1996 |
| JP | 10-91767 | 4/1998 |
| JP | 10-207667 | 8/1998 |
| JP | 11-98308 | 4/1999 |
| JP | 2000-20270 | 1/2000 |
| JP | 2000-49987 | 2/2000 |
| JP | 02000270176 A * | 9/2000 |

* cited by examiner

Properties of Offline Printer [?] [×]

Paper Size
 ○ A5   ○ B5   ● A4   ○ B4   ○ A3

Orientation of Print
 ● Portrait   ○ Landscape

Resolution
 ○ 200DPI   ○ 300DPI   ● 600DPI

Both Sided Printing
 ○ No   ● Yes

Color for Printing
● Monochrome  ○ Color
 ├─ Image quality  ● High Quality (Low Compression)   ○ Normal   ○ High Compression (Low Quality)
 ├─ Color Space  ● YCrCb   ○ Lab
 └─ Encoding Method  ○ MH   ○ MR   ● MMR   ○ JBIG Procedure after Printing
● Delete both the job and the print data
○ Delete the job and leave the print data
○ Not delete either the job or the print data   [ OK ]   [ Cancel ]

FIG. 10

At pages 2, 4 and 5, color data were converted into monochrome data and printed.

This printer is not ready for an optimum "A3" sheet size.
The printing is put on hold.

This printer is not ready for an optimum "A3" sheet size.
Do you want reduction printing onto "A4" sheets?

OK    Cancel

FIG. 18

Print for Report

At pages 2, 5 and 6, reduction printing was carried out.

FIG. 19

Print for Report

Color data on pages 2,4 and 5 were converted into monochrome data.
At pages 2,5 and 6, reduction printing was carried out.

FIG. 20

This printer is not ready for an optimum "B5" sheet size.
Do you want enlargement printing onto "A4" sheets?

| OK | Cancel |

FIG. 21

Print for Report

At pages 2, 5 and 6, enlargement printing was carried out.

FIG. 22

Do you want to suspend or abandon the printing? In the case of abandonment, the printing job will be deleted.

| Suspension | Abandonment |

FIG. 23

Do you want to suspend or abandon the printing after 8 copies has been printed? In the case of abandonment, the setting of copies will be changed from 10 to 2.

| Suspension | Abandonment |

FIG. 24

10 printing jobs have been set.

For a job to be executed from now, select "execute", for a job not to be executed now, select "skip", and for a job to be deleted, select " delete"

After selection, press "OK" button, then the next printing job can be selected.

Printing job 1    PC data, file#1, 10 copies

[Execute]    [Skip]    [Delete]

[OK]    [Cancel]

FIG. 25

Image reading by the scanner is completed.
Set the printing job as follows:

Print Side    [Both Sides]    [Single Side]

Copies    [10]  [△] [▽]

Procedure after job
[Delete both the job and the print data]
[delete the job and leave the print data]
[Not delete either the job or the print data]

[OK]   [Cancel]

FIG. 26

Printing cannot be done because the color of the data to be printed cannot be reproduced by this printer.

Printing cannot be done because the encoding method of the data to be printed cannot be processed by this printer.

IMAGE OUTPUTTING DEVICE FROM MOBILE STORAGE MEDIUM

TECHNICAL FIELD

The present invention relates to an image output apparatus that prints and displays data. More particularly, the present invention relates to a technology that is applied to a digital copying machine, an image formation apparatus (printer), a facsimile, a liquid crystal projector, a television set and the like and for recording image and text data together with predetermined information on the management and the processing of these data onto a removable and portable storage medium, whereby carrying out offline printing-out of the image and the text data automatically and efficiently.

BACKGROUND ART

Recently, the demand for high speed and multi-functional digital copying machines has arisen, and a so-called digital copying machine provided with a facsimile function, a printer function, etc. in addition to a copy function has been developed. A conventional digital copying machine will be described below, referring to the drawings.

FIG. 29 is a block diagram showing the flow of an image signal in a conventional digital copying machine.

As shown in FIG. 29, an image sensor 71 scans an original to convert reflected light from the original to an electric signal. An analog image signal from the image sensor 71 then is converted to a digital image signal by an analog-to-digital (A/D) converter 72. The converted digital image signal is subjected to image processing such as edge enhancement, trimming, halftone processing, and edit processing in an image processor 73. An image signal output from the image processor 73 is buffered in buffer memory 74 for speed control to be given to a laser driver 78. The laser driver 78 drives a semiconductor laser 79 to form an electrostatic latent image by laser beams output from the semiconductor laser 79.

The digital copying machine further includes a central processing unit (CPU) 85, a local area network (LAN) controller 80, page memory 84, a parallel interface (I/F) 81, a communication control unit (CCU) 82, and a compressor/expander 86, which are mutually connected by a CPU bus 83.

The CPU 85 includes random access memory (RAM) and read only memory (ROM) and controls the entire digital copying machine. The page memory 84 has capacity that can store at least one page of image data and is connected to the buffer memory 74. Image data stored in the page memory 84 is output to the laser driver 78 through the buffer memory 74 to be printed on paper.

The LAN controller 80 communicates with external equipment through a local area network (LAN). When the digital copying machine is used as a remote printer, external equipment such as a computer transmits a print control command and image data to the digital copying machine through the LAN. The CPU 85 stores the image data received through the LAN into the page memory according to the received print control command.

Using the parallel I/F 81, the digital copying machine and external equipment can be connected one to one. When the digital copying machine is used as a printer for the external equipment, the external equipment transmits a print control command and image data to the digital copying machine through the parallel I/F 81 of the digital copying machine. When the image scanner function of the digital copying machine is used by the external equipment, the external equipment transmits an image read control command to the digital copying machine through the parallel I/F 81, and read image data is transmitted to the external equipment from the digital copying machine.

The CCU 82 communicates with an external facsimile through a public network using a modem 87. Image data received by the facsimile is expanded by the compressor/expander 86, is transferred to the page memory 84, and is printed out. Also, image data read for facsimile transmission is stored in the page memory 84, is compressed by the compressor/expander 86, and is transmitted to the external facsimile through the CCU 82 and the modem 87.

Next, a conventional image reader will be described.

FIG. 30 is a block diagram showing the flow of an image signal in a conventional image reader.

In FIG. 30, an image sensor 171 scans an original to convert reflected light from the original to an electric signal. An analog image signal output from the image sensor 171 is converted to a digital image signal by an A/D converter 172, and is input to an image processor 173. With respect to the digital image signal, the image processor 173 performs image processing such as edge enhancement, trimming, halftone processing, pixel density conversion, and gradation level conversion as well as edit processing. Image data output form the image processor 173 is stored in buffer memory 174.

For controlling the entire image reader, a CPU 185 including a RAM and a ROM is provided. The CPU 185, the image processor 173, the buffer memory 174, a DMA (direct memory access) controller 180, and a small computer system interface (SCSI) controller 181 are mutually connected through a CPU bus 183.

The DMA controller 180 DMA transfers image data stored in the buffer memory 174 to the SCSI controller 181. External equipment such as a computer transmits a control command for the image reader to the image reader through the SCSI controller 180 and receives image data from the image reader. The CPU 185 sets the degree of edge enhancement, the gradation level of image data, read density, etc. according to the image read control command.

Generally, a high-speed digital plain paper copier (PPC) capable of copying more than tens of sheets per minute is located in a common space such as a copy room or a hallway. When copying a document that is prepared by a personal computer, etc. in plural copies, a user has to print the original by a nearby printer, take the original to a place where a digital copying machine is located, and then copy the original in plural copies using a sorter, etc. of the digital copying machine. Especially, when a personal computer used by a user is not connected through a LAN, the remote print function of the digital copying machine cannot be used, so that copying must be done as mentioned above. In this case, an original image is once printed on paper before copying it, and therefore the image is inevitably degraded.

When a personal computer used by a user is connected to the digital copying machine through a LAN, the user can use the remote print function of the digital copying machine. Therefore, the user directly can utilize a function such as a sorter of the digital copying machine from his/her personal computer. However, when copying by using the remote print function of the digital copying machine, the user has to go to a distant place where the digital copying machine is located to take printed paper. Also, when copying in large amounts using the remote print function, problems such as paper-out and paper jam are likely to occur. To solve these troubles, the user also has to go to the place where the digital copying machine is located. Thus, the utility value of the remote (online) print function in a high-speed digital copying machine is not very high.

When using the image scanner function of the digital copying machine from a user's personal computer online by using the parallel I/F 81 shown in FIG. 29 and the LAN, similar problems arise. That is, the user has to go to a distant place where the digital copying machine is located to set an original in the image scanner part of the digital copying machine. Therefore, when the digital copying machine and the user's computer are located a distance apart, it is not useful to use the image scanner function of the digital copying machine online.

Such an image reader is connected to external equipment such as a personal computer one to one using an interface such as a SCSI. Therefore, the image reader is used exclusively by the user of the connected personal computer. When another user attempts to use the image reader, the user has to use the personal computer connected to the image reader or connect the image reader to his/her personal computer.

When a user carries his/her personal computer to such as a business destination and attempts to print a document, it is troublesome to connect the personal computer through a LAN at the business destination. In some cases, on the ground of security, a user's carried personal computer may not be connected to a LAN at a business destination. If a printer and a scanner at a business destination and at a convenience store are equipped with an offline function, data to be printed can be printed easily and data on a paper document can be converted into electronic form easily through a memory card.

DISCLOSURE OF THE INVENTION

With the foregoing in mind, it is an object of the present invention to provide an image output apparatus that is easily applicable to a digital copying machine, an image formation apparatus (printer), a facsimile, a liquid crystal projector, a television set and the like and for recording image and text data together with predetermined information on the management and the processing of these data onto a removable and portable storage medium, whereby carrying out offline printing or display outputting of the image and the text data automatically and efficiently is possible.

It is another object of the present invention to realize an offline printing function by storing e-mail data and a text file received by a mobile phone into a portable storage medium capable of being installed into the mobile phone and then by inserting this portable storage medium into equipment having a printing function such as a facsimile and a printer.

It is still another object of the present invention to realize an offline printing function by storing data contained in data broadcasting that is transmitted to a TV set capable of receiving the data broadcasting into a portable storage medium capable of being installed into the TV set, and then by inserting this portable storage medium into equipment having a printing function such as a facsimile and a printer.

It is a further object of the present invention to give a presentation without using a computer by storing slide image data produced using a computer into a portable storage medium and then by inserting this portable storage medium into equipment having a display function such as a liquid crystal projector.

In order to fulfill the above-stated objects, a first image output apparatus according to the present invention, which prints out data in a data file as visible data, the data in the data file being read from a portable storage medium in which the data to be printed is stored as the data file, includes: portable storage medium access means for accessing the portable storage medium to read out the data in the data file to be printed; image discrimination means for discriminating whether the data in the data file to be printed, which is read out by the portable storage medium access means, is color image data or monochrome image data; color/monochrome conversion means for converting color image data into monochrome image data; monochrome image formation means for printing out monochrome image onto a recording medium as the visible data; and print confirmation means for, when the image discrimination means discriminates that the data in the data file to be printed is color image data, confirming with a user whether or not to print out monochrome image data, which is converted from the color image data by the color/monochrome conversion means, by the monochrome image formation means.

According to this first image output apparatus, which is a monochrome printer having a color/monochrome conversion function, when data to be printed that is stored in the portable storage medium is color image data, confirmation is carried out for a user as to whether to print out converted monochrome image data or to stop the printing. This can eliminate the probability that the user misunderstands original image data as monochrome. The user can be notified that the original image data was color image data, and therefore the color image data may be printed using a color printer if the user wishes to do so. As a result, unnecessary monochrome printing can be avoided.

In order to fulfill the above-stated objects, a second image output apparatus according to the present invention, which prints out data in a data file as visible data, the data in the data file being read out from a portable storage medium in which the data to be printed is stored as the data file, includes: portable storage medium access means for accessing the portable storage medium to read out the data in the data file to be printed; image discrimination means for discriminating whether the data in the data file to be printed, which is read out by the portable storage medium access means, is color image data or monochrome image data; color/monochrome conversion means for converting color image data into monochrome image data; monochrome image formation means for printing out monochrome image onto a recording medium as the visible data; and print notification means for, when the image discrimination means discriminates that the data in the data file to be printed is color image data, notifying a user that monochrome image data, which is converted from the color image data by the color/monochrome conversion means, has been printed out by the monochrome image formation means.

According to this second image output apparatus, when the second image output apparatus is a monochrome printer having a color/monochrome conversion function and when data to be printed that is stored in the portable storage medium is color image data, the user is notified that monochrome image data converted from the color image data was printed out. Thereby, if the user wishes to conduct printing-out by a color printer, printing-out can be done again using the color printer. As this notification method for the user, for example, it is preferable to display a message on a liquid crystal display provided at an operation section of the monochrome printer, or to print a report on another sheet.

In order to fulfill the above-stated objects, a third image output apparatus according to the present invention, which outputs data in a data file to be subjected to a job as visual data, the data to be subjected to a job being read out from a portable storage medium in which the data to be subjected to the job is stored as the data file and job information for executing a predetermined procedure with respect to the data file is stored as a job file, includes: portable storage medium access means for accessing the portable storage medium to read out contents of the data file to be subjected to the job and the job file; and job deletion confirmation means for, after completing the job for the data file to be subjected to the job, confirming with a user whether or not to delete the job information.

According to this third image output apparatus, the job information can be left by confirming with the user, assuming the case where the user might wish to conduct printing-out again, although the job information normally is deleted after completing the job in the case where for the purpose of offline printing, usage such as a print spool is done while the data to be printed remains to be stored. For example, there may be cases where printing has been conducted on a wrong sheet or mistakenly using a monochrome printer although data to be printed originally is color image data. In addition, even when the job information is deleted, the data to be printed itself is not deleted. Therefore, although automatic printing using the job information cannot be done, printing by designating a data file to be printed can be done if providing a user interface to select data to be printed.

In the above third image output apparatus, it is preferable that the job information contains job deletion information indicating whether or not to delete the job information after completing the job, and the job deletion confirmation means makes the user confirm whether or not to delete the job information, even when the job deletion information instructs to delete the job information after completing the job.

With this configuration, a more user-friendly and convenient apparatus can be realized.

In order to fulfill the above-stated objects, a fourth image output apparatus according to the present invention, which outputs data in a data file to be subjected to a job as visual data, the data to be subjected being read out from a portable storage medium in which the data to be subjected to the job is stored as the data file and job information for executing a predetermined procedure with respect to the data file is stored as a job file, includes: portable storage medium access means for accessing the portable storage medium to read out contents of the data file to be subjected to the job and the job file; and job/data deletion confirmation means for, after completing the job for the data file to be subjected to the job, confirming with a user whether or not to delete the job information and the data to be subjected to the job.

According to this fourth image output apparatus, both the job information and the data to be printed can be left by confirming whether a user wishes to conduct printing-out again, although the data to be printed itself needs to be generated again in the case where the user wishes to conduct printing-out again when such a print spool function that the data to be printed itself is deleted together with the job information is executed under a normal operation. For example, there may be cases where printing has been conducted on a wrong sheet or mistakenly using a monochrome printer although data to be printed originally is color image data.

In the above fourth image output apparatus, it is preferable that the job information contains job/data deletion information indicating whether or not to delete the job information and the data subjected to the job after completing the job, and the job/data deletion confirmation means makes the user confirm whether or not to delete the job information and the data subjected to the job, even when the job/data deletion information instructs to delete the job information and the data subjected to the job after completing the job.

With this configuration, a more user-friendly and convenient apparatus can be realized.

In order to fulfill the above-stated objects, a fifth image output apparatus according to the present invention, which outputs data in a data file to be output as visible data, the data to be output being read out from a portable storage medium in which the data to be output is stored as the data file, includes: portable storage medium access means for accessing the portable storage medium to read out the data to be output; processing capability detection means for detecting whether or not the data in the data file to be output is required for processing more than a processing capability of the image output apparatus to output the data as visual data; and notification means for, when the processing capability detection means detects that the data in the data file to be output is required for processing more than the processing capability, notifying a user that outputting of the image cannot be done based on the detection result.

According to this fifth image output apparatus, in the case of offline printing and if the data to be printed, which is stored in the portable storage medium, cannot be processed for printing with the printer, the user is notified of the reason why the printing cannot be done. Therefore, this apparatus can offer the user an opportunity to regenerate data to be printed or to change a printer used. As this notification method for the user, for example, it is preferable to display a message on a liquid crystal display provided at an operation section of the printer, or to print a report on another sheet.

In the above fifth image output apparatus, it is preferable that the data in the data file to be output is color image data, and the notification means refers to information on a color space of the color image data in the data file to be output and notifies the user that the color image data cannot be output as visual data by the image output apparatus due to the color space.

In addition, in the above fifth image output apparatus, it is preferable that the data in the data file to be output is image data, and the notification means refers to information on an encoding method of the image data in the data file to be output and notifies the user that the image data cannot be output as visual data by the image output apparatus due to the encoding method.

Furthermore, in the above fifth image output apparatus, it is preferable that the data in the data file to be output is image data, the image output apparatus further includes image formation means for printing out the image data onto a recording medium as the visual data, and the notification means refers to a size of the image data in the data file to be output and notifies the user that the image data cannot be printed out as visual data due to the size of the image data. In this case, it is preferable that the fifth image output apparatus further includes resolution conversion means for converting the image data into image data with a low resolution, and the notification means asks the user whether or not to print out the image data with the low resolution converted by the resolution conversion means onto the recording medium as visual data, thereby allowing the user to confirm.

According to these configurations, if the paper size is smaller than the size of the image data, by notifying the user that the printing cannot be done or confirming for the user whether reduction printing is acceptable, this apparatus can offer the user an opportunity to conduct printing by another printer capable of using a larger sheet size or can prevent the user from being given the misunderstanding that the size of the original image data stored in the portable storage medium is a size as a result of the reduction printing.

In order to fulfill the above-stated objects, a sixth image output apparatus according to the present invention, which prints out data in a data file as visible data, the data to be printed being read out from a portable storage medium in which the data to be printed is stored as the data file and the data in the data file to be printed being image data, includes: portable storage medium access means for accessing the portable storage medium to read out the image data to be printed; image enlargement means for enlarging a size of the image data; image formation means for printing out the image data onto a recording medium as the visible data; and printing notification means for, when the size of the image data is smaller than a size of the recording medium, notifying a user that the size of the image data has been enlarged by the image enlargement means and the enlarged image data has been printed out onto the recording medium by the image formation means.

According to this sixth image output apparatus, if the size of the image data is smaller than the paper size, by confirming for a user whether enlargement printing is acceptable, this apparatus can prevent the user from being given the misunderstanding that the size of the original image data stored in the portable storage medium is a size as a result of the enlargement printing.

In order to fulfill the above-stated objects, a seventh image output apparatus according to the present invention, which prints out data in a data file as visible data, the data to be printed being read out from a portable storage medium in which the data to be printed is stored as the data file and the data in the data file to be printed being image data, includes: portable storage medium access means for accessing the portable storage medium to read out the image data to be printed; image reduction means for reducing a size of the image data; image formation means for printing out the image data onto a recording medium as the visible data; and printing notification means for, when the size of the image data is larger than a size of the recording medium, notifying a user that the size of the image data has been reduced by the image reduction means and the reduced image data has been printed out onto the recording medium by the image formation means.

According to this seventh image output apparatus, if the size of the image data is larger than the paper size, by confirming for a user whether reduction printing is acceptable, this apparatus can prevent the user from being given the misunderstanding that the size of the original image data stored in the portable storage medium is a size as a result of the reduction printing.

In order to fulfill the above-stated objects, an eighth image output apparatus according to the present invention, which outputs data in a data file to be subjected to a job as visual data, the data to be subjected to the job being read out from a portable storage medium in which the data to be subjected to the job is stored as the data file and job information for executing a predetermined procedure with respect to the data file is stored as a job file, includes: portable storage medium access means for accessing the portable storage medium to read out contents of the data file to be subjected to the job and the job file; image formation means for printing out the data in the data file to be subjected to the job onto a recording medium as the visual data; and job deletion confirmation means for, when a user instructs to stop printing before the image formation means finishes the printing up to a number of copies designated by the job information, confirming for the user whether or not to delete the job information.

This eighth image output apparatus can offer a user an opportunity to select abandonment or suspension of the printing.

In order to fulfill the above-stated object, a ninth image output apparatus according to the present invention, which outputs data in a data file to be subjected to a job as visual data, the data to be subjected to the job being read out from a portable storage medium in which the data to be subjected to the job is stored as the data file and job information for executing a predetermined procedure with respect to the data file is stored as a job file, includes: portable storage medium access means for accessing the portable storage medium to read out contents of the data file to be subjected to the job and the job file; and image formation means for printing out the data in the data file to be subjected to the job onto a recording medium as the visual data, wherein when a user instructs to stop printing before the image formation means finishes the printing up to a number of copies designated by the job information, the number of jobs where printing normally has been conducted is deducted from the designated number of copies.

This ninth image output apparatus can offer a user an opportunity to select abandonment or suspension of the printing, and also can enhance the accuracy in the number of copies after suspension, compared with the above seventh image output apparatus.

In order to fulfill the above-stated objects, a tenth image output apparatus according to the present invention, which outputs data in a data file to be subjected to a job as visual data, the data to be subjected to the job being read out from a portable storage medium in which the data to be subjected to the job is stored as the data file and job information for executing a predetermined procedure with respect to the data file is stored as a job file, includes: portable storage medium access means for accessing the portable storage medium to read out contents of the data file to be subjected to the job and the job file; image formation means for printing out the data in the data file to be subjected to the job onto a recording medium as the visual data; and job number reduction confirmation means for, when a user instructs to stop printing before the image formation means finishes the printing up to a number of copies designated by the job information, confirming with the user whether or not to reduce the number of jobs where printing normally has been conducted from the designated number of copies.

This tenth image output apparatus can offer a user an opportunity to select abandonment or suspension of the printing, can enhance the accuracy in the number of copies after suspension compared with the above eighth image output apparatus and can improve the convenience compared with the above ninth image output apparatus.

In order to fulfill the above-stated objects, an eleventh image output apparatus according to the present invention, which outputs data in a data file to be subjected to a job as visual data, the data to be subjected to the job being read out from a portable storage medium in which the data to be subjected to the job is stored as the data file and job information for executing a predetermined procedure with respect to the data file is stored as a job file, includes: portable storage medium access means for accessing the portable storage medium to read out contents of the data file to be subjected to the job and the job file; and job execution selection means for, before commencing execution of the job, allowing a user to select execution, skip, or deletion of the job.

According to this eleventh image output apparatus, when a plurality of printing jobs exist in the portable storage medium, and when the user will not execute all of the printing jobs using the printer, the user can select execution of each of the printing jobs, which improves the convenience.

In order to fulfill the above-stated objects, a twelfth image output apparatus according to the present invention, which outputs data in a data file to be subjected to a job as visual data, the data to be subjected to the job being read out from a portable storage medium in which the data to be subjected to the job is stored as the data file and job information for executing a predetermined procedure with respect to the data file is stored as a job file, includes: portable storage medium access means for accessing the portable storage medium to read out contents of the data file to be subjected to the job and the job file; and job parameters changing means for, before commencing execution of the job, allowing a user to change settings of parameters relating to the job.

According to this twelfth image output apparatus, for example, even when the information for designating double-sided printing in the job information does not designate the double-sided printing, designation for the double-sided printing can be done at the time of execution of the printing job, which eliminates the necessity of regenerating job information.

In order to fulfill the above-stated objects, a thirteenth image output apparatus according to the present invention, which outputs data in a data file to be subjected to a job as visual data, the data to be subjected to the job being read out from a portable storage medium in which the data to be subjected to the job is stored as the data file and job information for executing a predetermined procedure with respect to the data file is stored as a job file, includes: portable storage medium access means for accessing the portable storage medium to read out contents of the data file to be subjected to the job and the job file; and job information setting means for, before commencing execution of the job, allowing a user to set job information that is not included in the job information corresponding to the job. In this case, the thirteenth image output apparatus further includes image formation means for printing out the data in the data file to be subjected to the job onto a recording medium as the visual data, and the job information set by the job information setting means is paper handling information.

According to this thirteenth image output apparatus, for example, if the job information itself does not contain information for designating sorting and stapling but the printer has such functions, a user can utilize these functions at the execution of the printing job using a user interface of the printer.

In order to fulfill the above-stated objects, a fourteenth image output apparatus according to the present invention, which outputs data in a data file to be subjected to a job as visual data, the data to be subjected to the job being read out from a portable storage medium in which the data to be subjected to the job is stored as the data file and job information for executing a predetermined procedure with respect to the data file is stored as a job file, includes: portable storage medium access means for accessing the portable storage medium to read out contents of the data file to be subjected to the job and the job file; and image formation means for printing out the data in the data file to be subjected to the job onto a recording medium as the visual data, wherein the data stored in the portable storage medium is image data obtained by reading an original image by an image reader, and the image data is printed out onto the recording medium by the image formation means, according to printing job information set by a user in the image reader and stored corresponding to the image data.

According to this fourteenth image output apparatus, for example, at the office, when storing scanned image of hard-copy data into the portable storage medium using a scanner unit in the digital copying machine with both functions as a scanner and a printer, printing job information is designated using a user interface of the digital copying machine, and the printing job information also is stored into the portable storage medium, and then the scanned image can be printed by installing the portable storage medium, in which the scanned image and the corresponding printing job information are stored, into a digital copying machine provided at a business destination, which eliminates the necessity of printing the scanned image data onto sheets and carrying the sheets.

BRIEF DESCRIPTION OF DRAWINGS

FIG. 10 shows an example of a dialog box for a user to set properties of an offline printer.

FIG. 14 shows an example of a screen or a printed sheet to notify that monochrome data converted from color data was printed.

FIG. 17 shows an example of a screen to notify that the printer is not ready for an optimum "A3" sheet size and the printing is put on hold.

FIG. 18 shows an example of a screen to confirm whether or not reduction printing onto "A4" sheet is acceptable because the printer is not ready for an optimum "A3" sheet size.

FIG. 19 shows an example of a screen or a printed sheet to notify that reduction printing was carried out.

FIG. 20 shows an example of a screen or a printed sheet to notify that color data was converted into monochrome data and reduction printing was carried out.

FIG. 21 shows an example of a screen to confirm whether or not enlargement printing onto "A4" sheet is acceptable because the printer is not ready for an optimum "B5" sheet size.

FIG. 22 shows an example of a screen or a printed sheet to notify that enlargement printing was carried out.

FIG. 23 shows an example of a screen to confirm whether or not to delete the print job, when an instruction to stop printing in progress during the printing of multiple copies is input.

FIG. 24 shows an example of screen to confirm whether or not to reduce the number of normally printed copies, when an instruction to stop printing in progress during the printing of multiple copies is input.

FIG. 25 shows an example of a screen to select a print job to be executed from now among a plurality of printing jobs.

FIG. 26 shows an example of a screen to set the contents of a print job when a scanner function of the digital copying machine is utilized.

FIG. 27 shows an example of screen to notify that the printing cannot be done because color of data to be printed cannot be reproduced by this printer.

FIG. 28 shows an example of screen to notify that the printing cannot be done because encoding method of data to be printed cannot be processed by this printer.

BEST MODE FOR CARRYING OUT THE INVENTION

A digital copying machine as one example of an image output apparatus according to one embodiment of the present invention will be described in detail below, with reference to the drawings.

Figure 1:
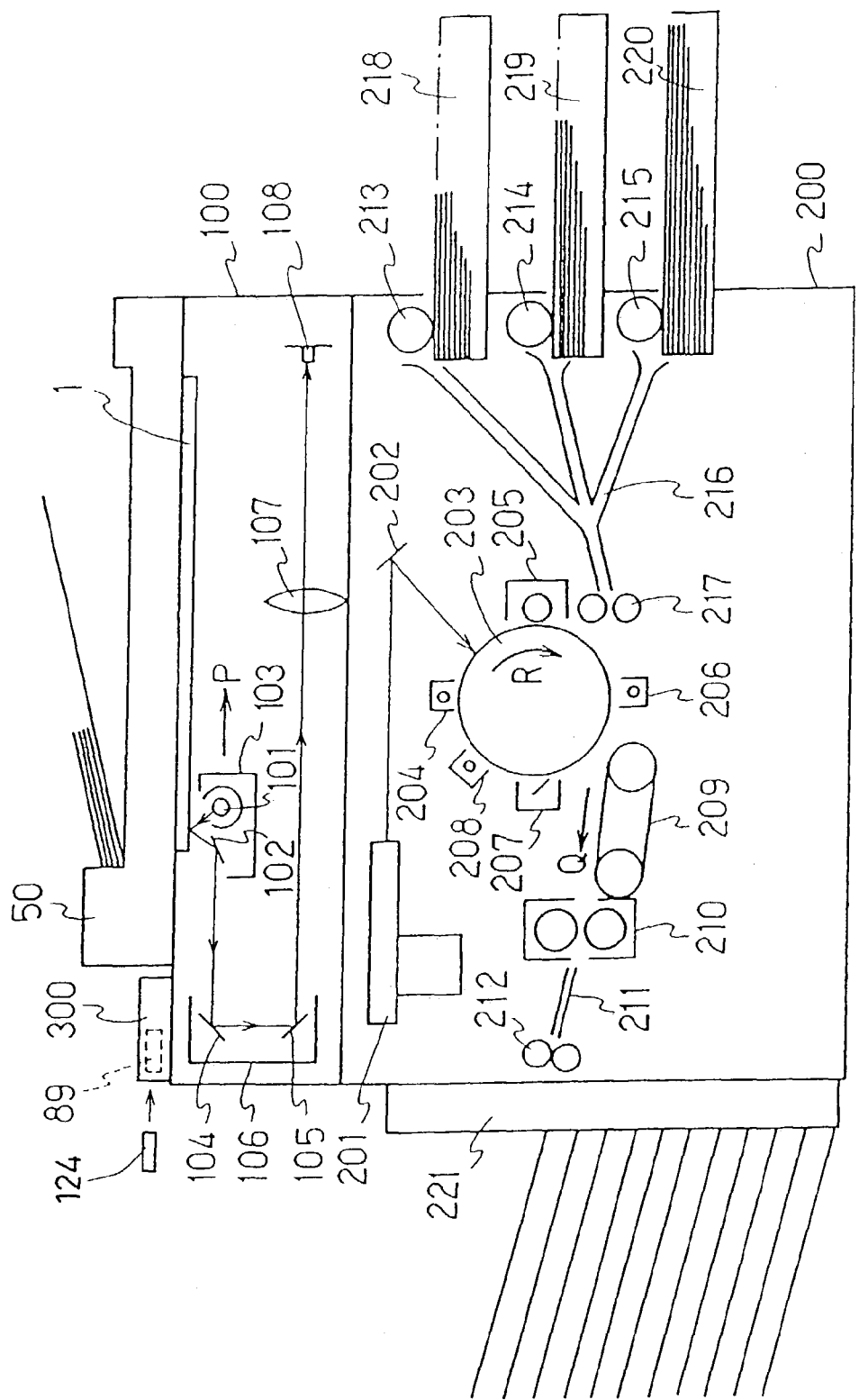
FIG. 1 is a cross-sectional view showing a configuration of a digital copying machine according to one embodiment of the present invention.

FIG. 1 is a cross-sectional view schematically showing the internal structure of a digital copying machine of this embodiment. This digital copying machine includes an auto document feeder (ADF) 50 provided on a document platen 1, an image scanner section 100 provided beneath the document platen 1, a laser printer section 200 provided independently beneath the image scanner section 100, and an operation section 300 provided at the side of the document platen 1. The operation section 300 is provided with a memory card slot 89 into which a memory card 124 functioning as a portable storage medium is inserted.

The operation section 300 includes a control panel 301. The control panel 301 is provided with a liquid crystal display 302 with a touch panel (confirmation and notification means), a start button 303, a stop button 304, a pause button 305 for copying, etc. and input buttons 306 such as a numeric keypad.

The image scanner section 100 includes an exposure lamp 101, a first mirror 102, a constant-speed unit 103, a second mirror 104, a third mirror 105, a half-speed unit 106, a lens 107 and an image sensor 108.

The laser printer section 200 includes a laser scanner unit 201, a mirror 202, a photoconductor drum 203, a main charging device 204, a developing device 205, a transfer charging device 206, a cleaner 207, a discharging lamp 208, a carrier belt 209, a fixing device 210, a guide 211, a paper ejection roller 212, paper feed rollers 213, 214 and 215, a guide 216, a timing roller 217, paper cassettes 218, 219 and 220, and a sorter 221. The laser scanner unit 201 includes a semiconductor laser, a polygonal motor, a polygonal mirror, and a laser optic system.

The basic operation of this digital copying machine will be described below.

A plurality of originals put on the ADF 50 are set downward on the document platen 1, which is a transparent glass plate, one by one. When the exposure lamp 101 exposes an original, reflected light from the original is reflected toward the second mirror 104 by the first mirror 102. The constant-speed unit 103 including the exposure lamp 101 and the first mirror 102 moves in the direction of an arrow P at a constant speed to scan the original. The half-speed unit 106 including the second mirror 104 and the third mirror 105 further reflects the reflected light from the first mirror 102 and moves in the same direction as that of the constant-speed unit 103 at half the speed of the constant-speed unit 103. The reflected light from the original through the half-speed unit 106 is focused by the lens 107 to be focused on the image sensor 108.

The photoconductor drum 203 rotates in the direction of arrow R at a constant speed. The main charging device 204 charges the photoconductor drum 203 uniformly. A laser beam output from the laser scanner unit 201 is reflected by the mirror 202 to form an electrostatic latent image on the photoconductor drum 203. The developing device 205 develops the electrostatic latent image using a toner to form a toner image on the photoconductor drum 203.

The cassettes 218, 219 and 220 are removable, and plural types of paper having different combinations of paper sizes and orientations are held in respective cassettes. The paper feed rollers 213, 214 and 215 feed sheets of paper in the cassettes one by one. The guide 216 guides the fed paper to the timing roller 217. The timing roller 217 controls paper feed timing so that the fed paper is in register with the toner image on the photoconductor drum 203. The toner image on the photoconductor drum 203 is transferred onto the paper by the electric field generated by the transfer charging device 206. The carrier belt 209 moves in the direction of an arrow Q to carry the paper to the fixing device 210. The fixing device 210 fixes the toner on the paper by heat.

The paper output from the fixing device 210 is guided to the sorter 221 through the guide 211 and the paper ejection roller 212. The sorter 221 includes a plurality of paper ejection trays (bins) and performs sorting in copying for each copy. Furthermore, the sorter 221 includes a staple function and a punch function. The cleaner 207 removes any residual toner on the photoconductor drum 203. The discharging lamp 208 exposes the photoconductor drum 203 to eliminate the electric charge on the photoconductor.

Next, a flow of signals in the digital copying machine of this embodiment will be described, referring to a block diagram of FIG. 2.

Figure 2:
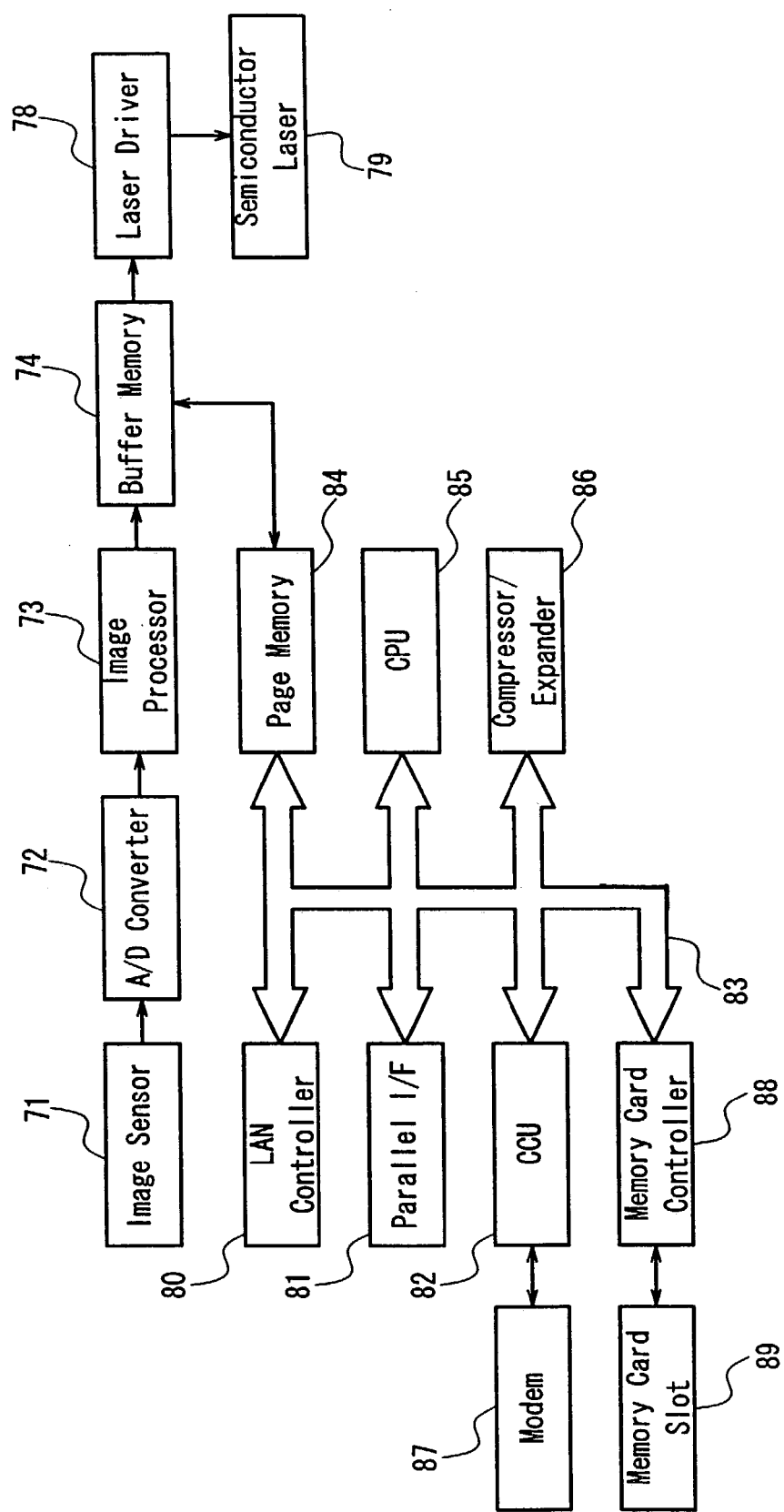
FIG. 2 is a block diagram showing a flow of signals in the digital copying machine shown in FIG. 1.

In FIG. 2, reflected light from an original obtained by scanning the original is converted to an electric signal by an image sensor 71, and then is converted to a digital image signal by an A/D converter 72. This digital image signal is subjected to image processing such as edge enhancement, trimming, and halftone processing, and edit processing in an image processor 73. An image signal from the image processor 73 is stored in buffer memory 74 for controlling a speed to be output to a laser driver 78. The laser driver 78 drives a semiconductor laser 79, and an electrostatic latent image is formed on the drum by a laser beam from the semiconductor laser 79.

The buffer memory 74 is connected to page memory 84. The page memory 84, a CPU 85, a LAN controller 80, a parallel I/F 81, a communication control unit (CCU) 82, a compressor/expander 86, and a memory card controller 88 are mutually connected by a CPU bus 83.

The CPU 85 includes a RAM and a ROM and controls the entire digital copying machine. The page memory 84 has capacity that can store at least one page of image data. Image data stored in the page memory 84 is output to the laser driver 78 through the buffer memory 74 to be printed on paper.

The LAN controller 80 communicates with external equipment through a local area network (LAN). When the digital copying machine is used as a facsimile transmission server, external equipment such as a computer transmits the telephone number of a transmit destination and image data to the digital copying machine through the LAN. The CPU 85 controls the compressor/expander 86 to compress the image data received from the external equipment through the LAN as required.

The CCU 82 transmits the image data MH compressed by the compressor/expander 86 to an external facsimile through a public network using a modem 87.

Also, using the parallel I/F 81, the digital copying machine and external equipment can be connected one to one. In this case, the digital copying machine can be controlled from a nearby computer. By executing dedicated software for controlling a digital copying machine on a computer connected to the digital copying machine, a copy mode such as the numbers of pages and copies, a paper size, copy density, a magnification rate, both side copying, and a sorting method can be set. Also, complicated edit setting such as the setting of frame erasure or a trimming area, or the setting of the reversal and its area can be done using the display and the mouse of the computer.

Image data received by facsimile is expanded by the compressor/expander 86, is transferred to the page memory 84, and is printed out. Image data read for facsimile transmission is stored in the page memory 84, then is compressed by the compressor/expander 86, and is transmitted to an external facsimile through the CCU 82 and the modem 87.

The memory card controller 88 (portable storage medium access means) controls an access from the CPU 85 to the memory card 124 installed in a memory card slot 89. If a job file storing print job information and a data file to be printed exist in the memory card 124 installed into the memory card slot 89, this digital copying machine prints data in the data file to be printed according to the contents of the job file.

Figure 13:
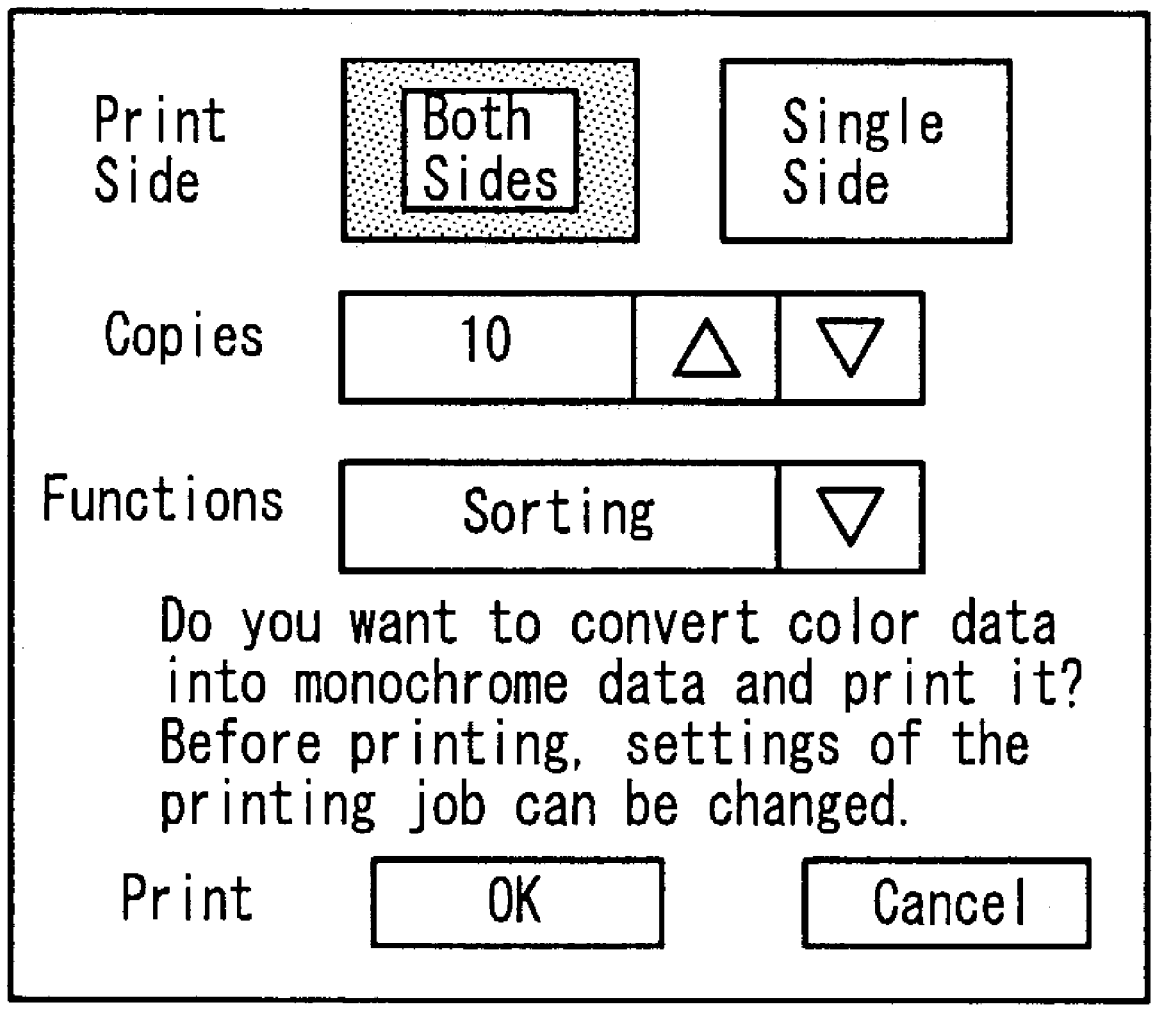
FIG. 13 shows an example of a screen to confirm whether or not to print monochrome data converted from color data.

Note here that since the digital copying machine of this embodiment is for monochrome copying, when the CPU 85 (image discrimination means) discriminates that the data to be printed, which is stored in the memory card 124, is color image data, then the color image data read out from the memory card 124 is stored in the page memory 84 and is converted into monochrome image data by a color/monochrome conversion circuit 90. Thereafter, a message is displayed on the liquid crystal display 302 with a touch panel in the control panel 301 of the operation section 300 so as to confirm with a user whether or not to print the image data even in monochrome although the original image data is color. Thereby, the user is allowed to recognize that the original image data is color image data. After the user inputs an instruction of "OK" to print the image data even in monochrome, the monochrome printing of the monochrome image data is carried out. When the user inputs an instruction of "Cancel" of printing, the print job is completed. FIG. 13 shows an example of a screen displayed on the touch panel 302 at this time.

Alternatively, first of all, the monochrome image data converted from the color image data is printed in monochrome, and then a message that conversion into monochrome and printing was done is displayed on the touch panel 302. Otherwise, after conversion into monochrome and printing is done, a report notifying that conversion into monochrome and printing was done is printed out. FIG. 14 shows an example of a screen displayed on the touch panel 302 or of a printed sheet for report at this time. In FIG. 14, a message that "At pages 2, 4 and 5, color data were converted into monochrome data and printed.", is shown as one example.

In this case, the digital copying machine functions as an offline printer.

The above-stated discrimination by the CPU 85 as to whether the image data stored in the memory card 124 is color or monochrome is done based on whether or not a page including color image data exists after searching image data included in all of the pages. However, as described later, if image management information concerning image data to be printed is stored as a manager file in the memory card 124, then discrimination about color/monochrome can be done easily by checking management information (color space of the image data) in the manager file, which shows whether or not the image data to be printed includes color pages.

Note here that although the above case describes the digital copying machine equipped with the memory card slot 89, the present invention is applicable to a display apparatus equipped with a memory card slot, e.g., a liquid crystal projector. In such a case, if a job file storing display job information and a data file to be displayed exist in the memory card 124 installed into the memory card slot, this liquid crystal projector displays data in the data file to be displayed according to the contents of the job file. In this case, the liquid crystal projector functions as an offline display.

Specific functions according to the job file in an image output apparatus such as the above-stated offline printer and offline display will be described later in detail.

The following describes a configuration of a file stored in the memory card 124, with reference to FIGS. 3 to 7.

Figure 3:
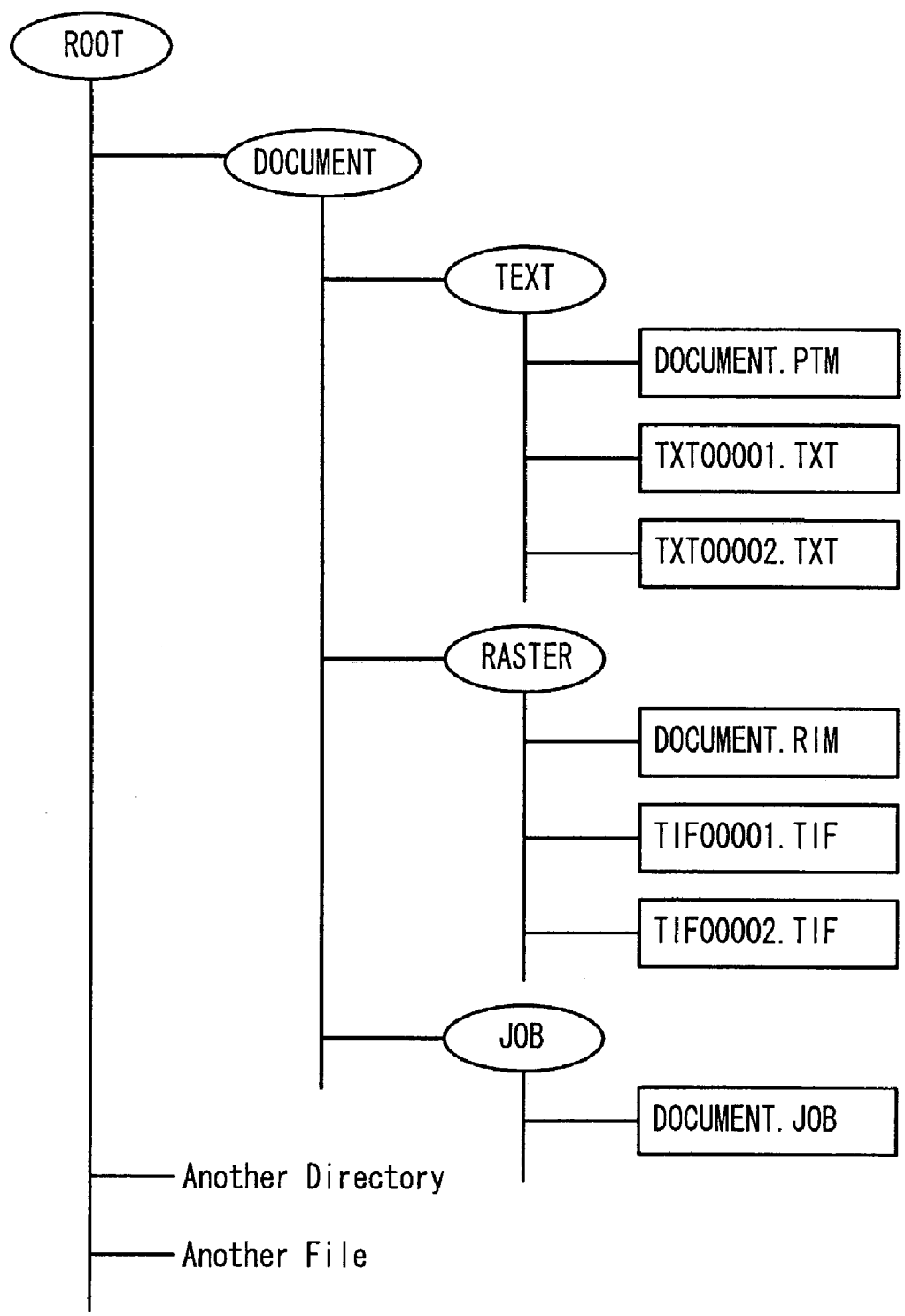
FIG. 3 shows directories and file configurations of data recorded in the memory card 124 shown in FIG. 1.

FIG. 3 shows directories and file configurations of data recorded in the memory card 124.

In FIG. 3, there is a directory DOCUMENT under a root directory (ROOT), under which all of the files according to this embodiment are located. Under the directory DOCUMENT, a directory for text data files (TEXT), a directory for multi-page image data files (RASTER) and a directory for job files (JOB) are located.

The directory for text data files (TEXT) includes a plurality of text data files TXT00001.TXT, TXT00002.TXT, etc., and one text manager file DOCUMENT.PTM (Plain Text Manager) for managing each of the text data files. Note here that the numerical portion of the data file names indicates a file number.

Figure 4:
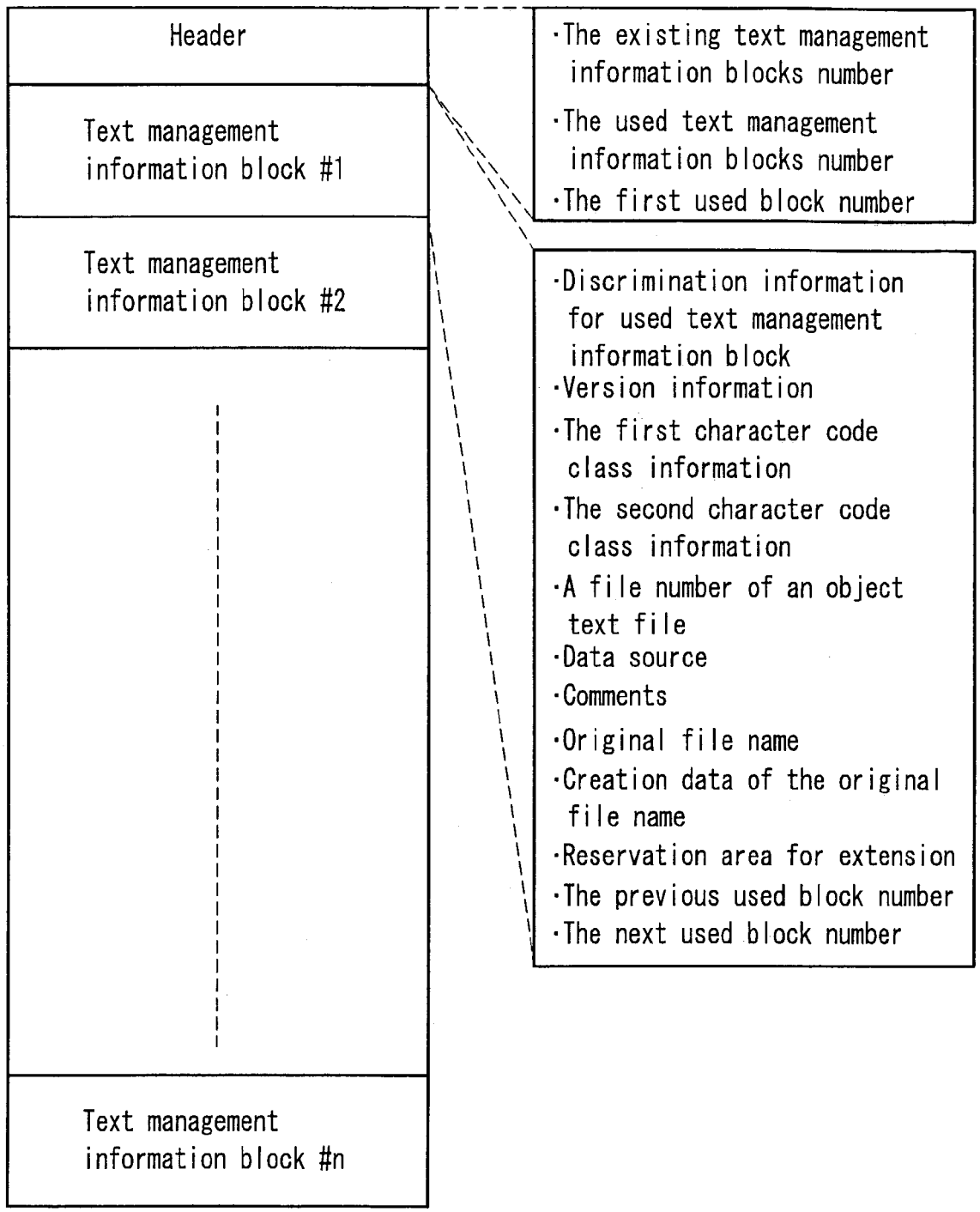
FIG. 4 shows a file configuration of the text manager file DOCUMENT. PTM shown in FIG. 3.

FIG. 4 shows a file configuration of the text manager file DOCUMENT.PTM.

In FIG. 4, the text manager file DOCUMENT.PTM is configured with a header having a fixed size, which is necessarily provided, and a plurality of text management information blocks #1 to #n each having a fixed size, which optionally can be added or deleted. Here, #1 to #n indicate block numbers.

The header includes the following information:

the number of text management information blocks existing in the text manager file;

the number of used text management information blocks among the existing blocks; and the first used block number indicating the text management information block that firstly becomes used.

Each of the text management information blocks includes the following information:

discrimination information for used text management information block indicating whether or not a text management information block is used, corresponding to whether a text data file managed by the text management information exists or not;

version information concerning a format of the text management information;

the first character code class information on text data used in a text data file;

the second character code class information on text data used in a text management information block;

a file number of an object text data file;

data source such as output mail, input mail and an address book;

comments on a text data file;

original file name before the conversion of a text data file into the above-described TXTxxxxx.TXT, where xxxxx denotes a file number;

creation date of the original file name;

reservation area for extension;

the previous used text management information block number (if there is no previous text management information block, 0 is entered); and the next used text management information block number (if there is no next text management information block, 0 is entered).

In the thus configured text manager file, text data files and their corresponding text management information can be stored efficiently by using the first used block number included in the header, discrimination information for used text management information blocks, the previous used block number and the next used block number included in each of the text management information blocks #1 to #n. As an example, the following describes a case where a text data file is added, with reference to FIGS. 5A and 5B.

Figure 5A:
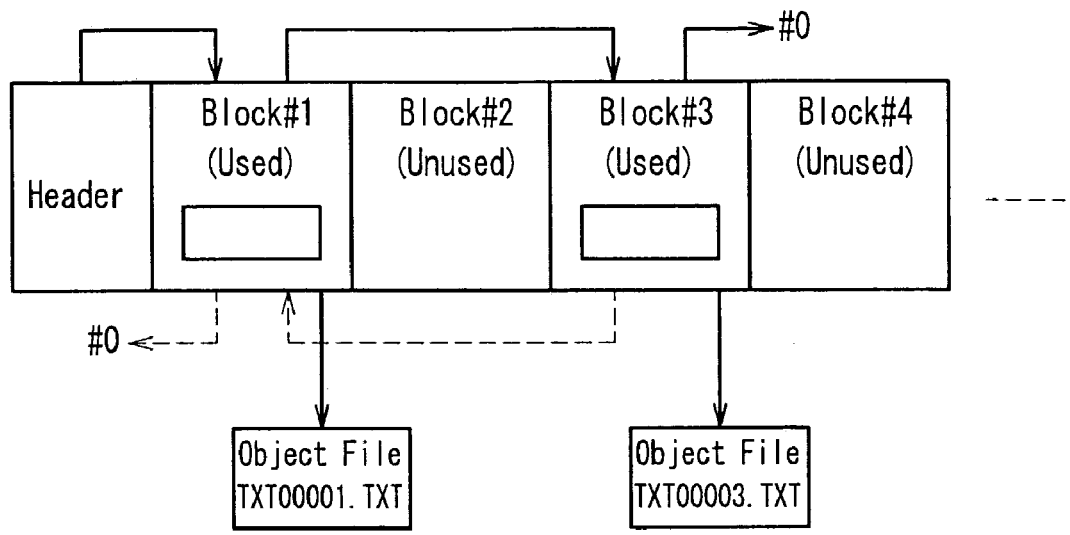
FIG. 5A schematically shows a text manager file and an object text file before adding a text data file.
Figure 5B:
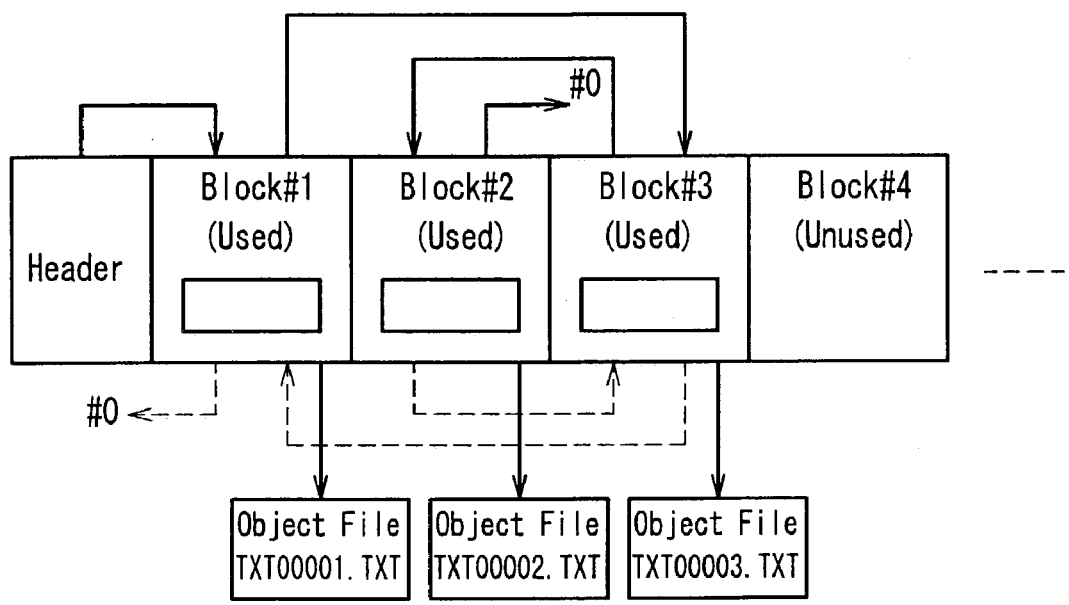
FIG. 5B schematically shows a text manager file and an object text file after adding a text data file.

FIGS. 5A and 5B respectively are schematic diagrams showing the text manager file and object text files before and after adding a text data file. In FIGS. 5A and 5B, the next used text management information block number in a text management information block is indicated by an arrow illustrated with a solid line, and the previous used text management information block number in the same is indicated by an arrow illustrated by a dashed line.

As shown in FIG. 5A, firstly, the header shows #1 as the first used block number. Then, by referring to #3 as the next used block number in the text management information block #1, it can be found that the text management information block #2 located between the text management information blocks #1 and #3 is not used.

Next, as shown in FIG. 5B, in the text management information block #2, the discrimination information for used text management information block is changed from "unused" to "used", and the previous used block number is set at "#3" and the next used block number is set at "#0". Subsequently, the next used block number in the text management information block #3 is changed from "#0" to "#2".

Next, 1 is added to the number of used text management information blocks in the header, and then the text data file is stored as a file name of TXT00002.TXT.

In this way, the inclusion of the previous used block number and the next used block number in each of the text management information blocks enables the construction of a file configuration having a bi-directional list configuration, so that text data files and their corresponding text management information can be stored in the memory card 124 efficiently.

In addition, the directory for multi-page image data files (RASTER) shown in FIG. 3 includes a plurality of multi-page image data files TIF00001.TIF, TIF00002.TIF, etc., and one image manager file DOCUMENT.RIM (Raster Image Manager) for managing each of the multi-page image data files. As a format of the multi-page image files, generally available TIFF (Tag Image File Format) by Adobe is used.

Figure 6:
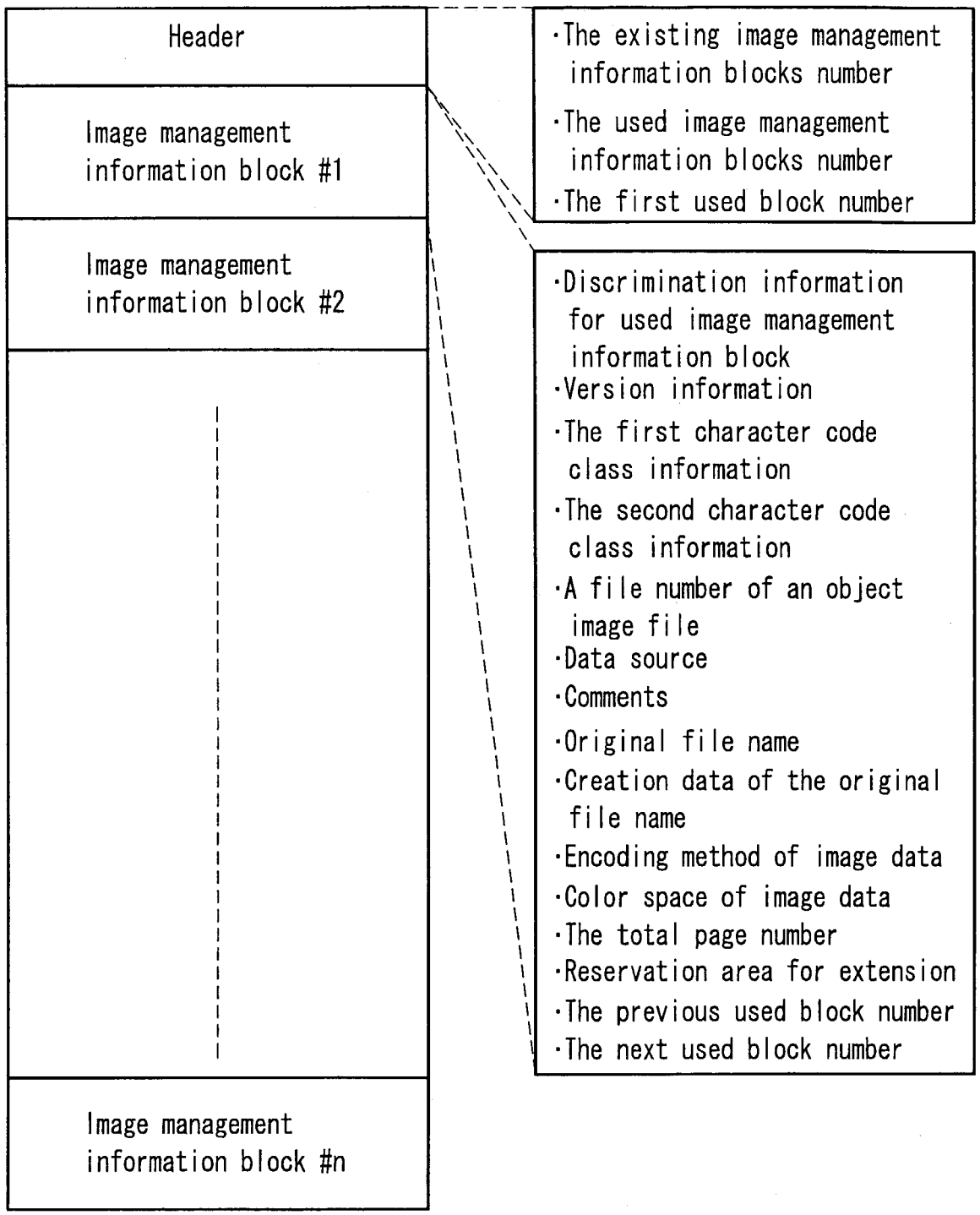
FIG. 6 shows a file configuration of the multi-page image manager file DOCUMENT. RIM shown in FIG. 3.

FIG. 6 shows a file configuration of the image manager file DOCUMENT.RIM.

In FIG. 6, the image manager file DOCUMENT.RIM is configured with a header having a fixed size, which is necessarily provided, and a plurality of image management information blocks #1 to #n, each having a fixed size, which can be optionally added or deleted. Here, #1 to #n indicate block numbers.

The header includes the following information:

the number of image management information blocks existing in the image manager file;

the number of used image management information blocks among the existing blocks; and the first used block number indicating the image management information block that firstly becomes used.

Each of the image management information blocks includes the following information:

discrimination information for used image management information block indicating whether an image management information block is used or not, where the information corresponds to whether a multi-page image data file managed by the image management information exists or not;

version information concerning a format of the image management information;

the first character code class information on character data used in a multi-page image data file;

the second character code class information on character data used in a image management information block;

a file number of an object multi-page image data file;

data source such as a PC, an image scanner and a facsimile;

comments on a multi-page image data file;

original file name before the conversion of a multi-page image data file into the above-described TXTxxxxx.TIF, where xxxxx denotes a file number;

creation date of the original file name;

encoding method adopted in multi-page image data, such as JPEG, JBIG and MH (a plurality of encoding methods can be set because different encoding methods might be adopted for each page);

color space adopted in multi-page image data, such as YCbCr and La*b* and color/monochrome discrimination information (a plurality of color spaces can be set because different color spaces are adopted for each page);

the total page number of multi-page image data reservation area for extension;

the previous used image management information block number (if there is no previous image management information block, 0 is entered); and the next used image management information block number (if there is no next image management information block, 0 is entered).

The image manager file also has the same bi-directional list configuration as in the text manager file and therefore has the same advantages.

In addition, the directory for job files (JOB) shown in FIG. 3 includes one job file DOCUMENT.JOB for executing a procedure such as displaying and printing with respect to a plurality of text data files and a plurality of multi-page image data files.

Figure 7:
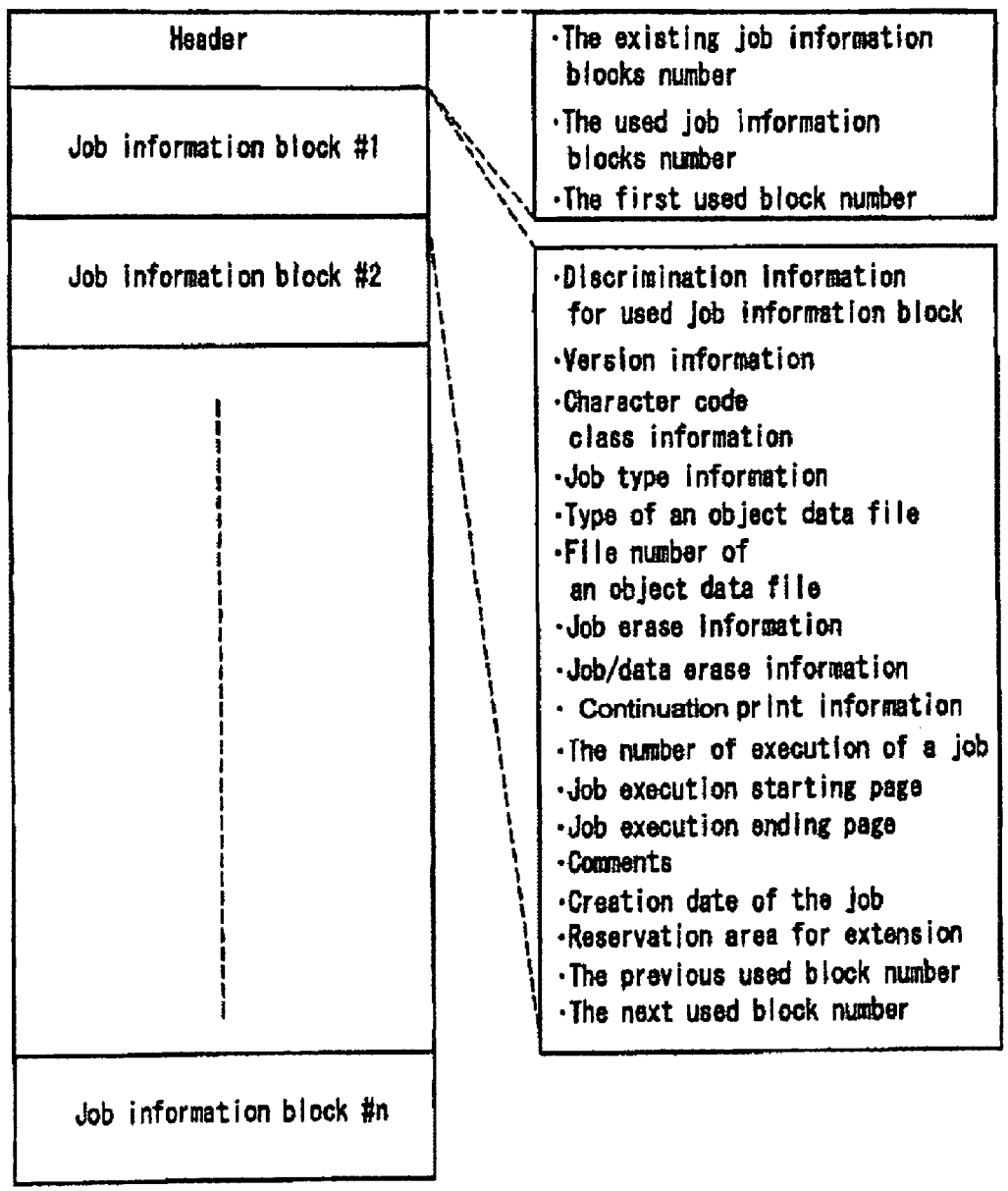
FIG. 7 shows a file configuration of the job file DOCUMENT. JOB shown in FIG. 3.

FIG. 7 shows a file configuration of the job file DOCUMENT.JOB.

In FIG. 7, the job file DOCUMENT.JOB is configured with a header having a fixed size, which is necessarily provided, and a plurality of job information blocks #1 to #n, each having a fixed size, which can be optionally added or deleted. Here, #1 to #n indicate block numbers.

The header of the job file includes the following information:

the number of job information blocks existing in the job file;

the number of used job information blocks among the existing blocks; and the first used block number indicating the job information block that firstly becomes used.

Each of the job information blocks includes the following information:

discrimination information for used job information block indicating whether a job information block is used or not;

version information concerning a format of the job information;

character code class information on character data used in the job file;

job type information indicating a type of job to be carried out, such as display and print;

a type of an object data file indicating that the data file subjected to the job is a text data file or a multi-page image data file;

a file number of a data file subjected to the job;

job erase information indicating whether or not to erase job information after the job is carried out normally;

job/data erase information indicating whether or not to erase both job information and a data file subjected to the job after the job is carried out normally;

continuation print information indicating, when small amount of text data such as e-mail has been printed on a printed sheet in the previous print job, whether or not to print small amount of text data such as e-mail in the current print job continuously on the printed sheet;

the number of execution of a job such as printing in plural copies;

job execution starting page and job execution ending page, which are effective only for multi-page image data files;

comments on a job;

creation date of the job;

reservation area for extension;

the previous used job information block number (if there is no previous job information block, 0 is entered); and the next used job information block number (if there is no next job information block, 0 is entered).

The job file also has the same bi-directional list configuration as in the text and the image manager files, whereby especially the addition and the deletion of jobs can be conducted easily.

The following describes specific examples of writing a text or an image data file, a manager file storing management information corresponding to the data file and a job file storing job information into the memory card 124 and reading out text or image data to be subjected to a job according to the job information so as to carry out a procedure such as print and display.

Figure 8:
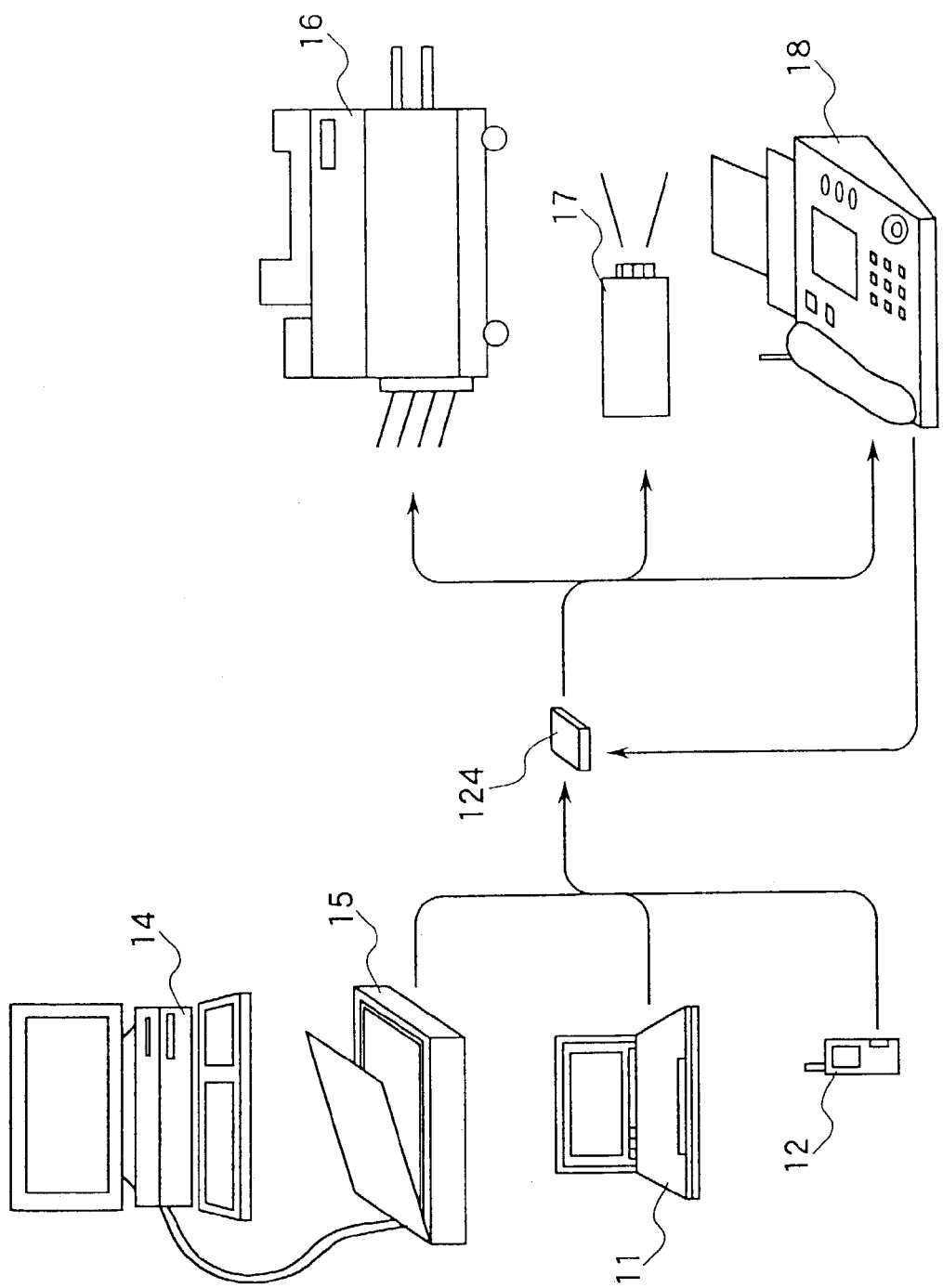
FIG. 8 shows a configuration of a system including a side equipped with a memory card writer and a side equipped with a memory card reader according to one embodiment of the present invention.

FIG. 8 shows a configuration of a system including a side equipped with a memory card writer and a side equipped with a memory card reader according to this embodiment.

In FIG. 8, the memory card writer side includes a notebook PC 11 provided with a writer for creating text or image data and writing the data onto the memory card 124, a mobile phone 12 provided with a writer for writing received e-mail onto the memory card 124, an image scanner 15 provided with a writer connected to a desktop PC 14 and for reading an original image and writing it onto the memory card 124 and the like.

The memory card read side includes a digital copying machine 16 for printing text or image data, a liquid crystal projector 17 for displaying image data and the like.

Reference numeral 18 denotes a facsimile for home use, which has both functions of writing received data onto the memory card 124 and reading out data written on the memory card 124 to print out.

Offline Printing Function From the Notebook PC 11

First, a function of offline-printing data using the digital copying machine 16, where the data is created by a user with the notebook PC 11, will be described in the following.

The user creates a document using application software for creating document, such as word processor or desk top publishing (DTP) software executed on the notebook PC 11.

Next, the memory card 124 is installed into a memory card slot provided in the notebook PC 11 in order to allow the created document data to be converted into image data using printer driver software for the memory card that is installed beforehand and to be written onto the memory card 124. At this procedure, as in the case of the text data described referring to FIGS. 5A and 5B, image management information corresponding to the image data is stored into an image manager file DOCUMENT.RIM. To this end, first, an unused image management information block (assuming it to be the block number #2) is retrieved. Then, the image management information as shown in FIG. 6 is stored in the text management information block #2 and the image data is stored as an image data file TIF0002.TIF. In this case, in the image management information block #2, for example, "00002" is set in "file number of an object image file" and a predetermined parameter indicating image data created using the PC 11 is set in "data source".

Figure 9:
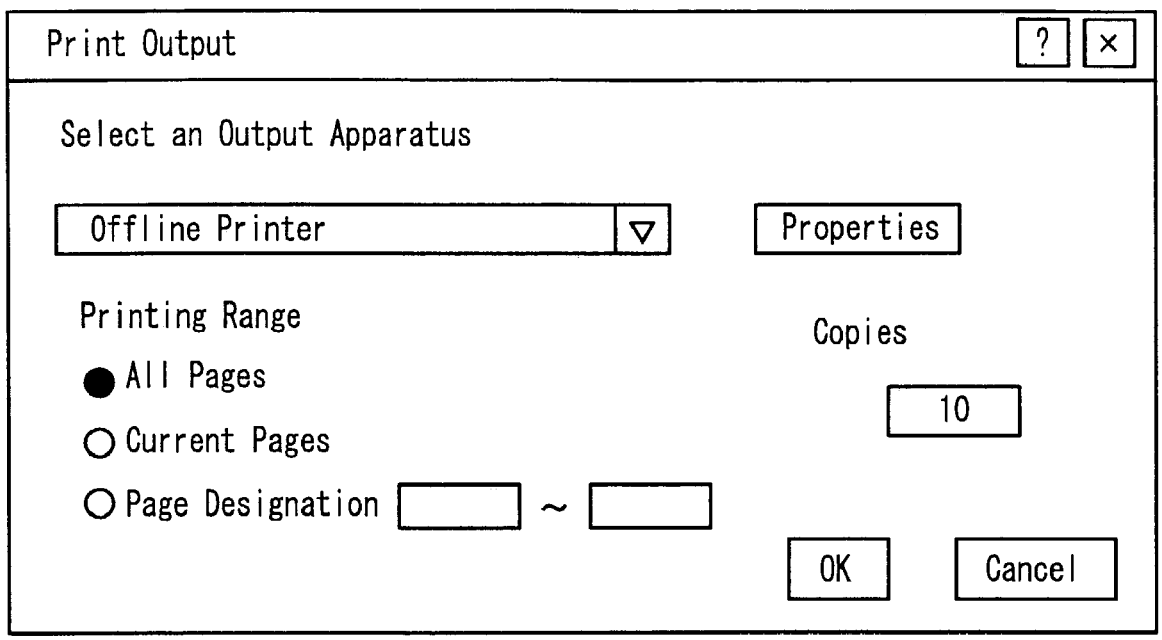
FIG. 9 shows an example of a screen for a user to select an offline printer.

When image data created by a user is printed offline using the digital copying machine 16, first of all, the user makes a user interface display a screen for selecting an output apparatus (offline printer) driver on a screen of the notebook PC 11 so as to select the offline printer on the screen. In addition, the user selects any one of "all pages", "current page" and "selected pages" in the section of printing range. In the case of FIG. 9, the printing of "all pages" is selected, which is indicated by the circle-solid mark. "10" is set in the section of copies.

Next, the user selects the box of properties for the offline printer so as to display on a screen of a personal computer a dialog box for setting a print job of the digital copying machine 16.

FIG. 10 shows an example of the dialog box for the offline printer. The following describes the contents to be selected in the dialog box shown in FIG. 10. In FIG. 10, items indicated by circle-solid marks are selected contents for printing.

1. Paper size: selecting from A5, B5, A4, B4, and A3:
2. Page orientation: selecting from Portrait and Landscape:
3. Resolution: selecting from 200 DPI(Dot Per Inch), 300 DPI and 600 DPI:
4. Both sided printing: selecting from No and Yes:
5. Color: as for the image data, selecting from Monochrome and Color. In the case of monochrome, an encoding method is selected from MH, MR, MMR and JBIG. In the case of color, an image quality is selected from High quality (Low compression), Normal and High compression (Low quality), and a color space is selected from YCbCr and La*b*. Note here that in the case of color, the encoding method applicable is JBIG only, and therefore there are no options for the encoding method but quantizing tables used for JPEG encoding are changed based on the selection of the image quality:
6. Procedure after printing: selecting from "delete both the job and the print data", "delete the job and leave the print data" and "not delete either the job or the print data".

After setting each of the items in the dialog box, the user clicks an OK button with a mouse. The printer driver produces a job file based on the settings in the dialog box and stores it into the memory card 124. Here, assuming that a new job file is created and stored in the job information block #1 shown in FIG. 7, the contents of the job file, which corresponds to the settings in the dialog box shown in FIG. 10, will be described in the following.

At a header of the job file, since there is no need to add a job information block, a default value is set in "the number of existing job information blocks". Since the job information block #1 only is used, "1" is set in "the number of used job information blocks; and "1" is set in "the first used block number", corresponding to the job information block #1 of the produced job information.

Additionally, in the job information block #1, a flag "1" indicating "used" is set in "the discrimination information for used job information block". The memory card standard number supported by the writer for this job is set in "the version information" and a character code class number such as ASCII codes and shift JIS, which is used in the job file, is set in "the character code class information".

A flag "0" indicating "print" is set in "the job type information", a flag "1" indicating "image data" is set in "the type of a data file to be processed" (in the case of text data, "0" is set), and "00002" is set in "the file number of a data file subjected to the job", which corresponds to the data file name TIF00002.TIF to be subjected to the job.

Flags "0" and "1" respectively are set in "the job erase information" and in "the job/data erase information", because a selection is made to erase both the job and the print data. When "delete the job and leave the print data" is selected in the dialog box shown in FIG. 10, then flags "1" and "0" respectively are set in the "the job erase information" and in "the job/data erase information", and when "not delete either the job or the print data" is selected, flags "0" and "0" respectively are set in the "the job erase information" and in "the job/data erase information".

A flag "0" is set in "the continuation print information", because this function is not used for offline-printing of the data created using the notebook PC 11.

A parameter "10" is set in "the number of executions of a job", because the user inputs "10" in the box of Copies on the screen for printing shown in FIG. 9. Since the user selects "all pages", "1" as the starting page and the ending page of the created multi-page image data are set in "the job execution starting page" and "the job execution ending page", respectively. In both "the previous used block number" and "the next used block number", "0" is set, because this job information is firstly stored.

The user, as shown in FIG. 8, removes the memory card 124 from the user's notebook PC 11 and then inserts it into the memory card slot 89 in the digital copying machine 16, where the memory card 124 holds the multi-page image data file TIF00002.TIF, the manager file in which image management information corresponding to the data file is described, and the job file in which the print job information on the object image data is described.

The CPU 85 in the digital copying machine 16 (FIG. 2) detects the installation of the memory card 124 via the memory card controller 88 and conducts a search as to whether the job file in which the print job information is described exists in the memory card 124 or not. If the job file exists, the CPU 85 analyzes the print job information in the job file for making settings required for control circuits in the laser printer section 200 and the sorter 221. In this case, the setting is done so as to carry out "double-sided printing" of an "A4" sized sheet in "Portrait" orientation, of "10" copies, and with the resolution of "600 DPI".

The CPU 85 refers to the multi-page image data file name (TIF00002.TIF) designated by the print job information in the job file and makes read out the multi-page image data file TIF00002.TIF from the memory card 124 to print out it.

Figure 15:
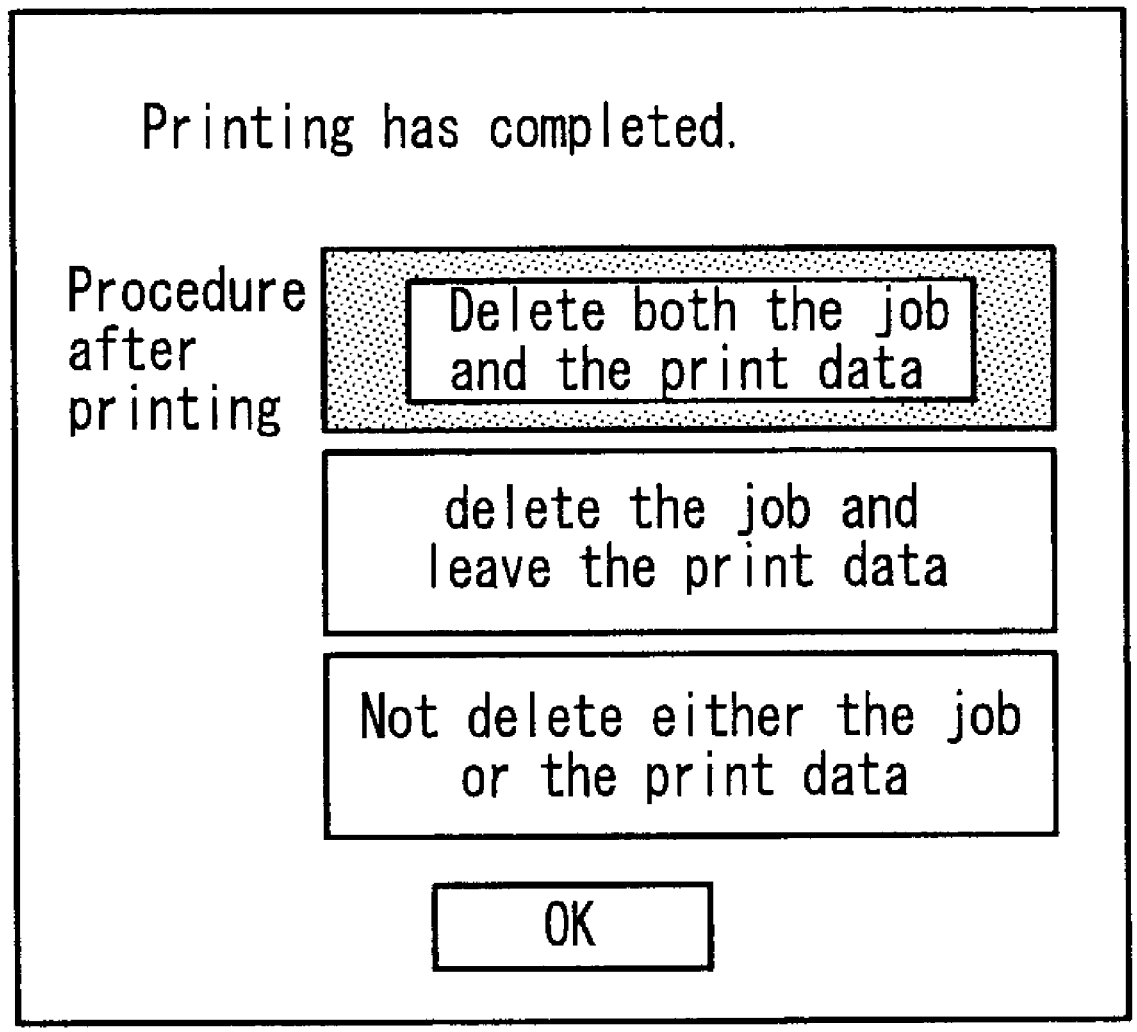
FIG. 15 shows an example of a screen to confirm whether or not to delete both the print data and the print job information after completing the print job.

When all of the printing output designated by the job file is completed, the CPU 85 gives the user a message for confirming whether or not to erase both the print job information and the image data file subjected to the job, which are stored in the memory card 124, based on the flags "0" and "1" in the "the job erase information" and in "the job/data erase information". Then only when the user inputs an instruction of OK to erase them, both the print job information and the image data file subjected to the job are erased. FIG. 15 shows an example of a screen displayed on the touch panel 302 during this procedure. As shown in FIG. 15, before commencing the execution of the job, settings of parameters for the print job information can be changed.

Figure 16:
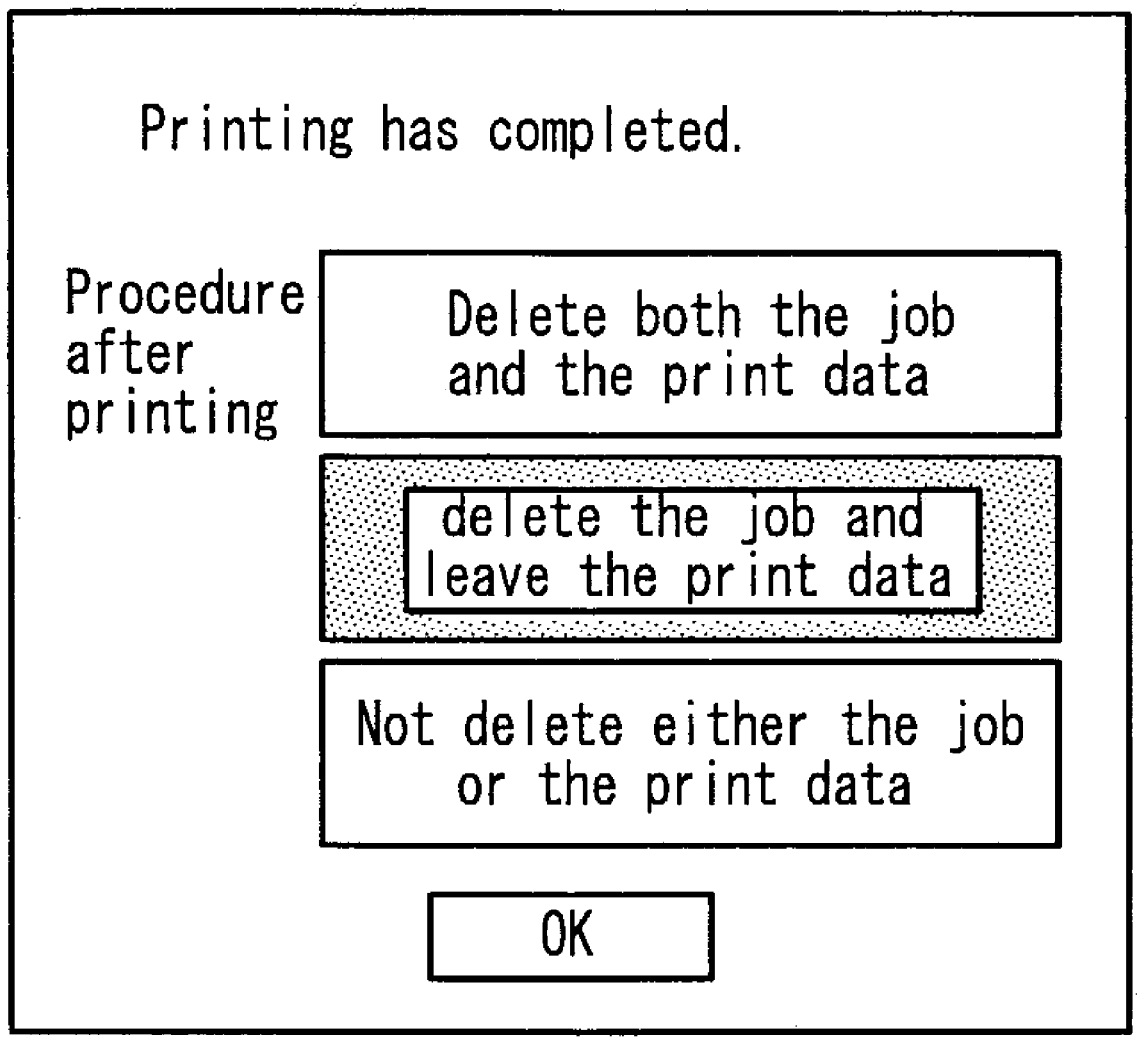
FIG. 16 shows an example of a screen to confirm whether or not to delete only the print job information after completing the print job.
Figure 29:
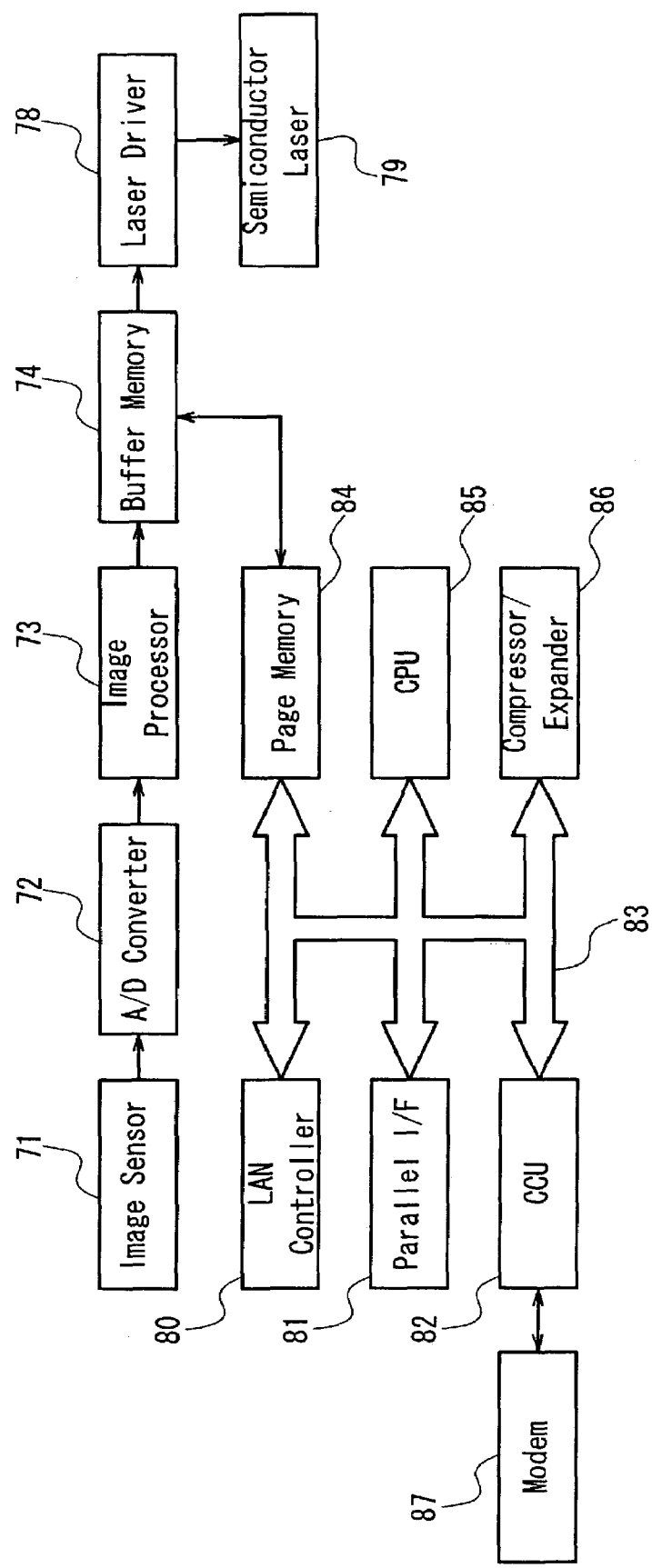
FIG. 29 is a block diagram showing a flow of signals in a conventional digital copying machine.
Figure 30:
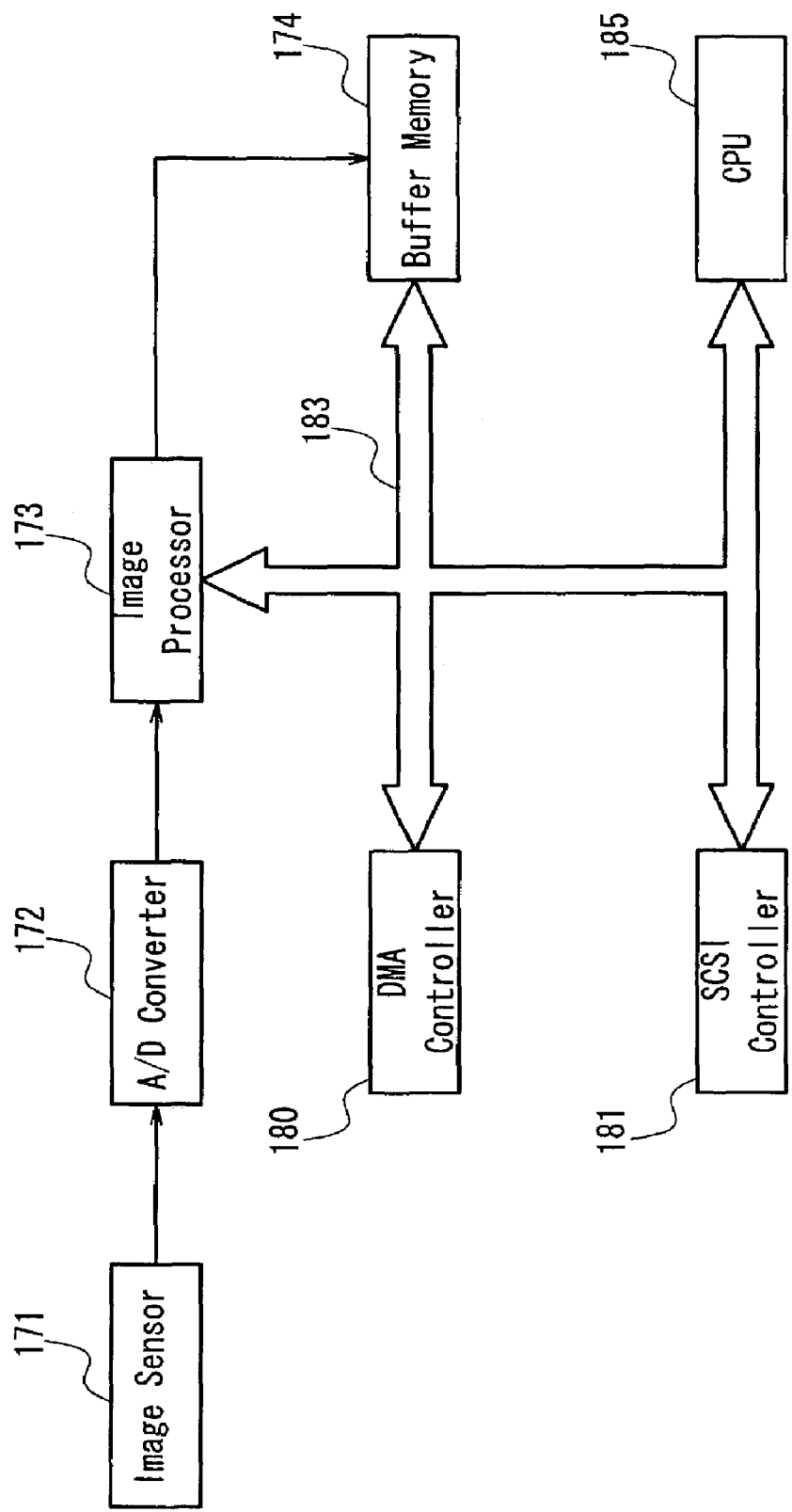
FIG. 30 is a block diagram showing a flow of signals in a conventional image reader.

Note here that the above-described example deals with the case where flags in "the job erase information" and in "the job/data erase information" are set at "0" and "1", respectively. However, when the flags in "the job erase information" and in "the job/data erase information" are set to be "1" and "0", respectively, a message is given to the user to confirm whether or not to erase only the print job information. Then, only when the user inputs an instruction of OK to erase it, the print job information is erased. FIG. 16 shows an example of a screen displayed on the touch panel 302 during this procedure. As shown in FIG. 16, before commencing the execution of the job, settings of parameters for the print job information can be changed.

Although the maximum size of the print sheet equipped with the digital copying machine 16 is A3, there might be only an A4 printer at a location where the user wishes to print offline. When the CPU 85 judges that a size of the image data to be printed is larger than A4 sheet, based on the information on the image width and the image length in TAG information added to each page of the multi-page image data file TIF00002. TIF stored in the memory card 124, the user is notified that printing cannot be done because the size of the image data is larger than A4 and other printers should be used (See FIG. 17) or in the case of the printer provided with an image reduction function such as the enlargement/reduction circuit 91 shown in FIG. 2, a message to confirm with the user whether reduction printing is OK is displayed (See FIG. 18). When the user inputs an instruction of OK to print, the reduction printing is carried out. On the other hand, when the user inputs an instruction of Cancel of printing, the print job is not executed. Alternatively, after the completion of the reduction printing, a message that "At pages 2, 5 and 6, reduction printing from A3 to A4 was carried out" is printed for report (See FIG. 19). Note here that as for the report, plural kinds of messages may be printed on one sheet. For example, the above-stated messages that "the color data was converted into monochrome" and "reduction printing from A3 to A4 was carried out." may be printed as one report (See FIG. 20).

On the other hand, when the CPU 85 judges that the size of the image data to be printed is suitable for a B5 sheet size smaller than A4, based on the information on the image width and the image length in TAG information added to each page of the multi-page image data file TIF00002. TIF stored in the memory card 124, but it is not ready for B5 sheet size, a message to confirm with the user whether enlargement printing using an image enlargement function (zoom) of the enlargement/reduction circuit 91 shown in FIG. 2 is OK is displayed (See FIG. 21). When the user inputs an instruction of OK to print, the enlargement printing is carried out. On the other hand, when the user inputs an instruction of Cancel of printing, the print job is not carried out. Alternatively, after the completion of the enlargement printing, a message that "At pages 2, 5 and 6, enlargement printing was carried out" is printed for report (See FIG. 22).

In addition, in spite of the setting in the job execution number as the job information in the job file stored in the memory card 124, i.e., the number of copies being set at "10", when the user gives an instruction to stop printing in progress of the printing of "10" copies, the user is notified as to whether or not to delete the job information concerning the job execution number (See FIG. 23) so as to confirm for the user whether to abandon or suspend the printing. In the case of abandonment, the job information is deleted and in the case of suspension, the job information is kept and the job is not carried out.

Alternatively, when the user gives an instruction to stop printing in progress of the printing of "10" copies, "the job execution number" in the corresponding job information in the job file is rewritten so as to reduce the number of normally printed copies from the job execution number of "10". Thereby, the accuracy of the number of copies after the suspension of the printing can be improved.

Alternatively, when the user gives an instruction to stop printing in progress of the printing of "10" copies, the user is notified as to whether or not to reduce the number of normally printed copies from the job execution number of "10" (See FIG. 24) and confirmation is issued to the user for abandonment or suspension of the printing. In the case of the abandonment, "the job execution number" in the corresponding job information in the job file is rewritten so as to reduce the job number. On the other hand, in the case of the suspension, the job information is kept and the job is not carried out. This configuration offers convenience for selection to users.

Further, when a plurality of print jobs exist in the memory card 124, the user can select not all of the print jobs but any one of them and execute the job. In this case, as shown in FIG. 25, before commencing the print job, the contents of all set jobs are displayed on the liquid crystal display 302 with a touch panel, which allows the user to select execution, skip, or deletion for each of the print jobs. Then, only the print jobs for which "execution" is selected by the user are executed. As for the print jobs for which "skip" is selected, the job information thereof is kept, and as for the print jobs for which "deletion" is selected, the job information is deleted. This improves the convenience to users because the user can select only the jobs that the user wishes to execute currently and then can execute the selected print jobs.

Moreover, before commencing the execution of the print job, the user can change the setting of parameters on the print job information using a user interface on the liquid crystal display 302 with a touch panel, e.g., "double-sided printing" in the print job information can be changed into "single-sided printing" or the number of copies can be changed (See FIG. 13). This eliminates the necessity for the user to regenerate the job information.

In addition, before commencing the execution of the print job, when the user wishes to execute contents of jobs that are not included in the job information in the job file, such as functions of sorting and stapling, the user can make the setting for such functions using a user interface on the liquid crystal display 302 with a touch panel before the execution of the printing (See FIG. 13).

With these configurations, especially as in the case of the notebook PC 11 equipped with the memory card writer that is not connected to external equipment through LAN or the like but is carried for use, for example, even when the user wishes to create document data at a place other than his/her desk in the office and print it out immediately to prepare material for presentation to customers, the user easily can offline print the desired document data at a service shop providing the digital copying machine 16 equipped with the memory card reader, such as at a convenience store.

In addition, when the user, who does not possess a printer at home, wishes to do simple printing, also, the user easily can offline print document data created using the notebook PC 11 equipped with a memory card writer, by providing and connecting a memory card reader with the facsimile for home use 18.

Offline Display Function From the Notebook PC 11

Next, the following describes a function of offline displaying data with the liquid crystal projector 17, where the data is created by a user with the notebook PC 11.

The user creates a document using application software for creating documents, such as word processor or desk top publishing (DTP) software executed on the notebook PC 11.

Next, the memory card 124 is installed into a memory card slot provided in the notebook PC 11 in order to allow the created document data to be converted into image data using printer driver software for the memory card that is installed beforehand and to be written onto the memory card 124. During this procedure, when color image data is created, for example, image management information corresponding to the color image data has to be stored into an image manager file DOCUMENT.RIM. To this end, first, an unused image management information block (assuming it as the block number #2) is retrieved. Then, the image management information as shown in FIG. 6 is stored in the image management information block #2 and the color image data is stored as a multi-page image data file TIF0002.TIF. In this case, in the image management information block #2, "0002" is set in "file number of an object image file", a predetermined parameter indicating image data created using a PC is set in "data source", a flag indicating that all pages include image data encoded by JPEG is set in "encoding method adopted in image data", and a flag indicating color and YCbCr is set in "color space of image data".

Figure 11:
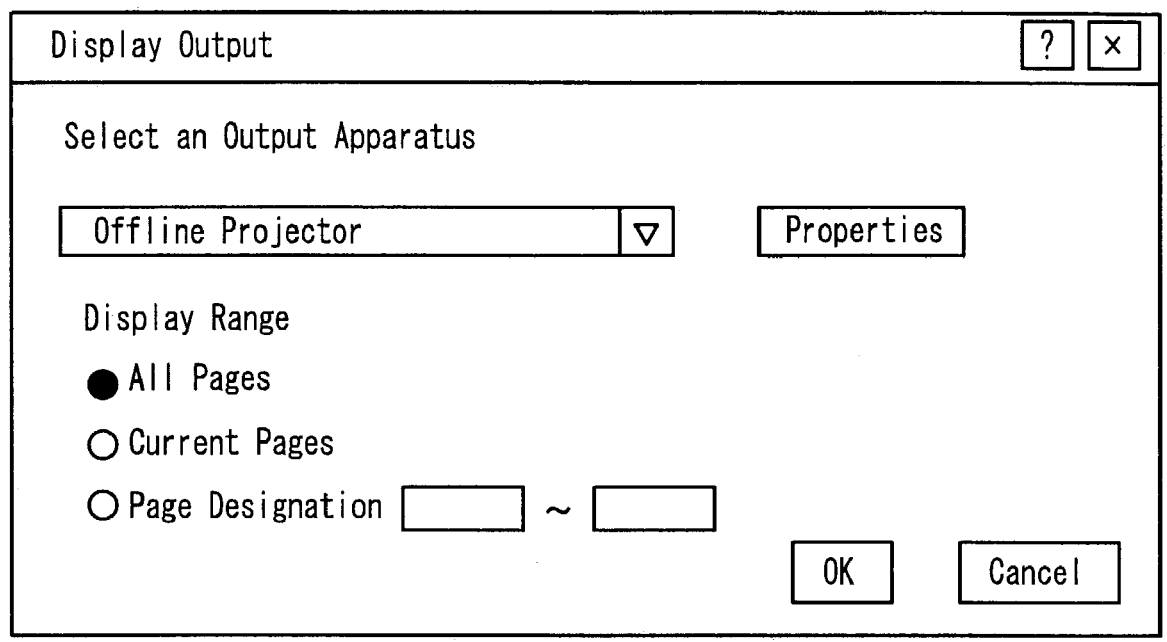
FIG. 11 shows a screen for a user to select an offline projector.

When image data created by a user is displayed offline using the liquid crystal projector 17, first of all, the user makes a user interface display a screen for selecting an output apparatus (offline projector) driver on a screen of the notebook PC 11 so as to select the offline projector on the screen, as shown in FIG. 11. In addition, the user selects any one of "all pages", "current page" and "selected pages" in the section of display range. In the case of FIG. 9, the displaying of "all pages" is selected, which is indicated by the circle-solid mark.

Next, the user selects the box of properties for the offline projector so as to display on a screen of a personal computer a dialog box for setting a print job of the liquid crystal projector 17.

Figure 12:
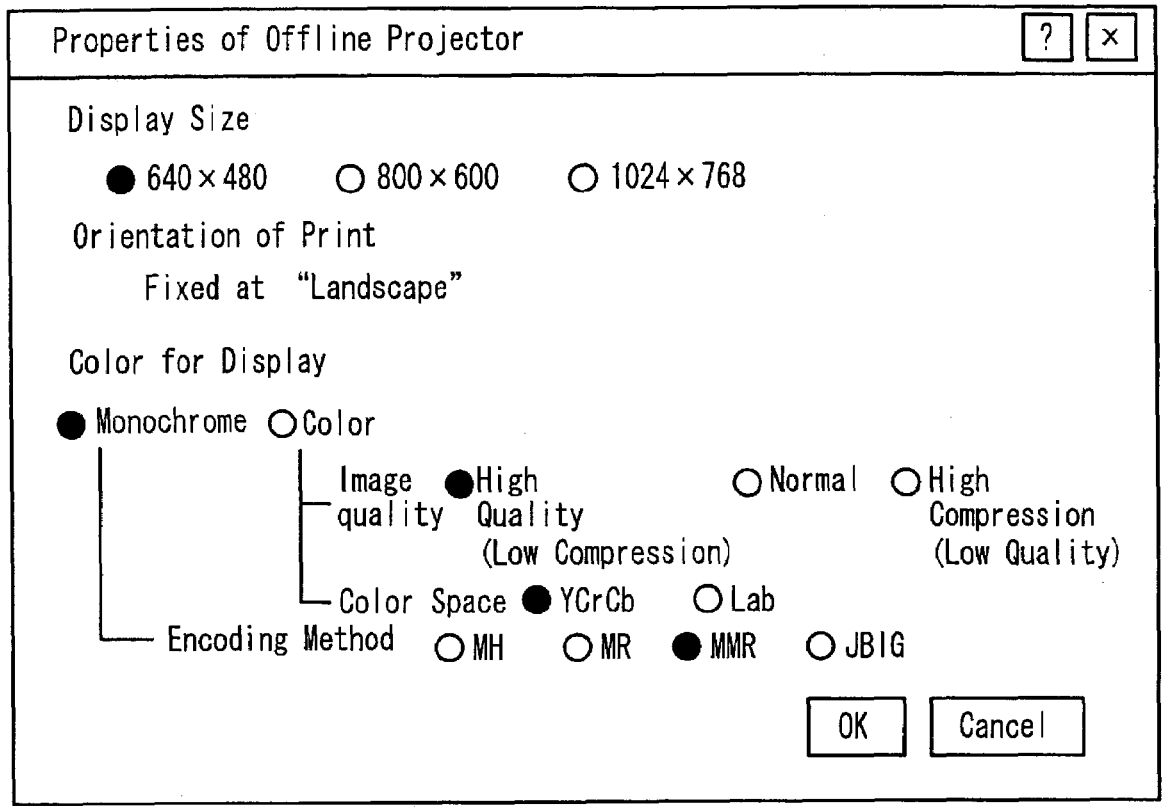
FIG. 12 shows an example of dialog box for a user to set properties of an offline projector.

FIG. 12 shows an example of the dialog box for the offline projector. The following describes the contents to be selected in the dialog box shown in FIG. 12. In FIG. 12, items indicated by circle-solid marks are selected contents for display.

1. Display size: selecting from "640×480", "800×600" and "1024×768", each of which indicates the number of pixels along horizontal direction×the number of scanning lines along vertical direction;
2. Page orientation: fixed at "landscape";
3. Color: as for the image data, selecting from "Monochrome" and "Color". In the case of "monochrome", an encoding method is selected from MH, MR, MMR and JBIG. In the case of "color", an image quality is selected from High quality (Low compression), Normal and High compression (Low quality), and a color space is selected from YCbCr and La*b*.

After setting each of the items in the dialog box, the user clicks an OK button with a mouse. The printer driver produces a multi-page image data file and a job file based on the settings in the dialog box and stores them into the memory card 124. Here, assuming that a new job file is created and stored in the job information block #1 shown in FIG. 7, the contents of the job file, which corresponds to the settings in the dialog box shown in FIG. 12, will be described in the following.

At a header of the job file, since there is no need to add a job information block, a default value is set in "the number of existing job information blocks". Since the job information block #1 only is used, "1" is set in "the number of used job information blocks; and "1" is set in "the first used block number", corresponding to the job information block #1 in the produced job information.

Additionally, in the job information block #1, a flag "1" indicating "used" is set in "the discrimination information for used job information block". The version number of the format of the job information supported by the writer for this job is set in "the version information" and a character code class number such as ASCII codes and shift JIS, which is used in the job file, is set in "the character code class information"

A flag "1" indicating "display" is set in "the job type information", a flag "1" indicating "image data" is set in "the type of an object data file", and "0002" is set in "the file number of an object data file", which corresponds to the data file name TIF00002.TIF to be subjected to the job.

In both "the previous used block number" and "the next used block number", "0" is set because this job information is firstly stored.

The user, as shown in FIG. 8, removes the memory card 124 from the user's notebook PC 11 and then inserts it into the memory card slot in the liquid crystal projector 17, where the memory card 124 holds the multi-page image data file TIF00002.TIF, the manager file in which image management information corresponding to the data file is described, and the job file in which the display job information on the object image data is described.

The CPU (not shown) in the liquid crystal projector 17 detects that the installation of the memory card 124 via the memory card controller and conducts a search as to whether the job file in which the display job information is described exists in the memory card 124 or not. If a plurality of job files exist, the CPU displays a list of management information and job information on the files to be displayed. Then, the user selects a job to be executed with a remote control unit. The CPU analyzes the display job information in the job file for making required settings. In this case, the setting is done so as to display in the size of "640×480", which indicates the number of pixels along horizontal direction×the number of scanning line along vertical direction.

The CPU in the liquid crystal projector refers to the multi-page image data file name (TIF00002.TIF) designated by the display job information in the job file and reads out the multi-page image data file TIF00002.TIF from the memory card 124 to display it.

With this configuration, when the user wishes to use document data created with the notebook PC 11 equipped with the memory card writer as material for presentation to customers or at the meeting in the company, the user easily can offline display the desired document data without using the personal computer but by preparing the liquid crystal projector 17 equipped with the memory card reader at the site.

Note here that although the above-description refers to offline print and offline display using the notebook PC as typical examples, image data read using the image scanner 15 equipped with a memory card writer at the office can be written onto the memory card 124, and the image data can be offline displayed with the liquid crystal display 17 equipped with the memory card reader when making a presentation at a meeting, as shown in FIG. 8.

In addition, image data read using a hand scanner connected to the facsimile 18 for home use equipped with the memory card writer can be written onto the memory card, and the image data can be captured into the notebook PC 11 equipped with the memory card reader.

Furthermore, when storing scanned image of hardcopy data into the memory card 124 using a scanner unit in the digital copying machine 16 provided with both functions as a scanner and a printer, print job information is designated using a user interface of the digital copying machine 16 (See FIG. 26), and the print job information also is stored in the memory card 124. Then, the scanned image can be printed by installing the memory card 124, in which the scanned image and the corresponding print job information are stored, into a digital copying machine provided at a business destination. This can eliminate the necessity of printing the scanned image data onto sheets and carrying the sheets.

The above-description deals with an example of offline printing or offline displaying image data. Meanwhile, examples of offline printing text data include offline printing of e-mail received by the mobile phone 12 equipped with the memory card writer. In this case, the mobile phone stores e-mail to be printed as a text file into the memory card and then updates DOCUMENT.PTM (Plain Text Manager) and job information. In this procedure, since the received e-mail contains small amount of data, the user may wish to offline print a plurality pieces of e-mail data continuously on the same sheet. To this end, "continuation print information" is used as the job information shown in FIG. 7, where a flag "1" should be set. When the memory card in which the text data and the job information for printing the text data are stored is installed into the printer, then the printer prints the text data on a sheet using font data stored in the printer.

In addition, document data created using the PC is converted into multi-page image data using a printer driver, and the converted data is transmitted to the mobile phone 12 equipped with the memory card writer as an attached file by e-mail. Then, the mobile phone stores the attached file into the memory card 124. This readily enables offline printing using a facsimile for home use and digital copying machines provided at the office or a service shop, which are equipped with a memory card reader.

While the memory card 124 is used as a removable storage medium in this embodiment, similar effects can be obtained using a floppy disk, optical disk, a removable hard disk, etc.

Also, while a monochrome digital copying machine is described in this embodiment, the same is true for a color copying machine. In this case, it is preferable that the color copying machine includes means for setting a color correction factor in accordance with color space for each page of the multi-page image data. However, in the case of offline printing using the printer that does not include the means for setting a color correction factor, according to this embodiment, "color space information" included in the management information on the color image data to be printed is referred to. If printing by the printer used is impossible due to the color space, the user is notified of such information (See FIG. 27).

It is preferable that the offline printer includes decoding means adaptable to various encoding methods of image data.

However, in the case of offline printing using the printer that does not include such decoding means, according to this embodiment, "encoding method information" included in the management information on the image data to be printed is referred to. If printing by the printer used is impossible due to the encoding method, the user is notified of such information (See FIG. 28).

As described above, according to the present invention, an image output apparatus can be realized which is readily applicable to a digital copying machine, a printer, a facsimile, a liquid crystal projector, a television set and the like and which is possible of carrying out offline print or display outputting of image and text data automatically and efficiently by recording the image and text data together with management information and job information having a bi-directional list structure onto a removable and portable storage medium.

The invention claimed is:

1. An image output apparatus that prints out data a visable image based on data in the data file, the apparatus reading out the data in the data file from a portable storage medium in which the data to be printed is stored as the data file, comprising:
   portable storage medium access means for accessing the portable storage medium to read out the data in the data file to be printed;
   image discrimination means for discriminating whether the data in the data file to be printed, which is read out by the portable storage medium access means, is color image data or monochrome image data;
   color/monochrome conversion means for converting color image data into monochrome image data;
   monochrome image formation means for printing out monochrome image onto a recording medium as the visible image; and
   print confirmation means for, when the image discrimination means discriminates that the data in the data file to be printed is color image data, allowing a user to confirm whether or not to print out a monochrome image based upon monochrome image data, which is converted from the color image data by the color/monochrome conversion means, by the monochrome image formation means.

2. An image output apparatus that prints out a visable image based on data in a data file, the apparatus reading out the data in the data file from a portable storage medium in which the data to be printed is stored as the data file, comprising:
   portable storage medium access means for accessing the portable storage medium to read out the data in the data file to be printed;
   image discrimination means for discriminating whether the data in the data file to be printed, which is read out by the portable storage medium access means, is color image data or monochrome image data;
   color/monochrome conversion means for converting color image data into monochrome image data;
   monochrome image formation means for printing out monochrome image data onto a recording medium as the visible data; and
   print notification means for, when the image discrimination means discriminates that the data in the data file to be printed is color image data, notifying a user that a monochrome image has been prited out based upon monochrome image data, which is converted from the color image data by the color/monochrome conversion means, by the monochrome image formation means.

3. An image output apparatus that prints out a visable image based on data in a data file to be subjected to a print job, the apparatus reading out the data to be subjected to the print job from a portable storage medium in which the data to be subjected to the print job is stored as the data file and job information for executing a predetermined procedure with respect to the data file is stored as a job file, comprising:
   portable storage medium access means for accessing the portable storage medium in which the data and the job information are stored to read out contents of the data file to be subjected to the print job and the job file; and
   job deletion confirmation means for making a user confirm whether or not the apparatus deletes the job information from the portable storage medium after completing execution of the print job for the data file to be subjected to the print job,
   wherein the job information includes information for designating the data file to be subjected to the print job, and
   the job information in the job file read out by the portable storage medium access means is analyzed, so as to execute the print job with respect to the data file designated by the job information.

4. The image output apparatus according to claim 3, wherein the job information contains job deletion information indicating whether or not to delete the job information from the portable storage medium after completing execution of the job, and the job deletion confirmation means makes the user confirm whether or not the apparatus deletes the job information, even when the job deletion information instructs to delete the job information after completing the execution of the job.

5. An image output apparatus that prints out a visible image based on data in a data file to be subjected to a print job, the apparatus reading out the data to be subjected to the print job from a portable storage medium in which the data to be subjected to the print job is stored as the data file and job information for executing a predetermined procedure with respect to the data file is stored as a job file, comprising:
   portable storage medium access means for accessing the portable storage medium in which the data and the job information are stored to read out contents of the data file to be subjected to the print job and the job file; and
   job/data deletion confirmation means for making a user confirm whether or not the apparatus deletes the job information and the data subjected to the print job from the portable storage medium after completing execution of the print job for the date file to be subjected to the print job,
   wherein the job information includes information for designating the data file to be subjected to the print job, and
   the job information in the job file read out by the portable storage medium access means is analyzed, so as to execute the print job with respect to the data file designated by the job information.

6. The image output apparatus according to claim 5, wherein the job information contains job/data deletion information indicating whether or not to delete the job information and the data subjected to the job from the portable storage medium after completing execution of the job, and the job/data deletion confirmation means makes the user confirm whether or not the apparatus deletes the job information and the data subjected to the job, even when the job/data deletion information instructs to delete the job information and the data subjected to the job after completing execution of the job.

7. An image output apparatus that outputs a visible image based on data in a data file to be output, the apparatus reading out the data in the data file from a portable storage medium in which the data to be output is stored as the data file, comprising:

portable storage medium access means for accessing the portable storage medium to read out the data in the data file to be output;

processing capability detection means for detecting whether the data in the data file to be output requires processing more than a processing capability of the image output apparatus to process the data so as to output the visible image; and notification means for, when the processing capability detection means detects that the data in the data file to be output is required for processing more than the processing capability, notifying a user that outputting of the image cannot be done based on the detection result, wherein the data in the data file to be output is color image data, and the processing capability detection means refers to information on a color space indicated by the color image data in the data file to be output and performs the detection according to whether or not it is possible to process for the color space of the color image data to output the visible by the image output apparatus.

8. An image output apparatus that outputs a visible image based on data in a data file to be output, the apparatus reading out the data in the data file from a portable storage medium in which the data to be output is stored as the data file, comprising:

portable storage medium access means for accessing the portable storage medium to read out the data in the data file to be output;

processing capability detection means for detecting whether the data in the data file to be output requires processing more that a processing capability of the image output apparatus to process the data so as to output the visible image; and notification means for, when the processing capability detection means detects that the data in the data file to be output requires processing more that the processing capability, notifying a user that the outputting of the image cannot be done based on the detection result, wherein the data in the data file to be output is image data, and the processing capability detection means refers to information on an encoding method indicated by the image data in the data file to be output and performs the detection according to whether or not is is possible to perform processing based on the encoding method to output the visible image by the image apparatus.

9. An image output apparatus that outputs a visible image based on image data in a data file to be output, the apparatus reading out the image data in the data file from a portable storage medium in which the image data to be output is stored as the data file, comprising:

portable storage medium access means for accessing the portable storage medium to read out the image data in the file to be output;

processing capability detection means for detecting whether the image data in the data file to be output requires processing more than a processing capability of the image output apparatus to process the data so as to output the visible image;

resolution conversion means for converting the image data into data of image with a low resolution;

image formation means for printing out the visual image based on the image data onto a recording medium; and notification means for, when the processing capability detection means detects that the data in the data file to be output requires processing more than the processing capability, notifying a user that outputting of the image cannot be done based on the detection result. p1 wherein the processing capability detection means refers to a size of the image data in the data file to be output and performs the detection according to whether or not the image data has a size such as capable of processed to print out visible image on to the recording medium by the image formation means, and the notification means notifies the user to confirm whether or not to perform processing to print out visible image based on the data of the image with the low resolution converted by the resolution conversion means onto the recording medium by the image formation means.

10. An image output apparatus that prints out a visible image based on data in a data file to be printed, the apparatus reading out the data in the data file from a portable storage medium in which the data to be printed is stored as the data file, and the data in the data file to be printed being image data, comprising:

portable storage medium access means for accessing the portable storage medium to read out the image data in the data file to be printed;

image enlargement means for enlarging a size of an image indicated by the image data;

image formation means for printing out the visible image based upon the image data onto a recording medium; and printing notification means for, when the size of the visible image is smaller that a size of the recording medium, notifying a user that the size of the image indicated by the image data has been enlarged by the image enlargement means and the enlarged visible data has been printed out onto the recroding medium by the image formation means.

11. An image output apparatus that prints out a visible image based on data in a data file, the apparatus reading out the data in the data file from a portable storage medium in which the data to be printed is stored as the data file and the data in the data file to be printed being image data, comprising:

portable storage medium access means for accessing the portable storage medium to read out the image data in the data file to be printed;

image reduction means for reducing a size of an image indicated by the image data onto a recording medium; and image formation means for printing out the visible image indicated by the image data onto a recording medium; and print notification means for, when the size of the visible image is larger than a size of the recording medium, notifying a user that the size of the image indicated by the image data has been reduced by the image reduction means and the reduced visible image has been printed out onto the recording medium by the image formation means.

12. An image output apparatus that prints out a visible image based on data in a data file, the apparatus reading out to be subjected to a job, the data to be subjected to the job from the portable storage medium in which the data to be subjected to the job is stored as the data file and job information for executing a predetermined procedure with respect to the data file is stored as a job file, comprising:

portable storage medium access means for accessing the portable storage medium storing the data and teh job information to read out contents of the data file to be subjected to the job and the job file;

image formation means for printing out the visible image based upon the data in the data file to be subjected to the job onto a recording medium; and job deletion confirmation neans for, when a user instructs to stop printing before the image formation means finishes the printing of a number of copies designated by the job information, making the user confirm whether or not the apparatus deletes the job information from the portable storage medium.

13. An image output apparatus that outputs a visible image data in a data file to be subjected to a job, the appratus reading out the data to be subjected to the job from a portable storage medium in which the data to be subjected to the job is stored as the data file and job information for executing a predetermined procedure with respect to the data file is stored as a job file, comprising:

portable storage medium access means for accessing the portable storage medium storing the data and the job information to read out contents of the data file to be subjected to the job and the job file; and image formation means for printing out the visible image based upon the data in the data file to be subjected to the job onto a recording medium, wheerin when a user instructs to stop printing before the image formation means finishes the printing of a number of copies designated by the job information, a number of copies defined by the number of jobs where printing normally has been conducted is deducted form the designated number of copies.

14. An image output apparatus that outputs a visible image baed on data in a data file to be subjected to a job, the apparatus reading out the data in the data file to be subjected to the job from a portable storage medium in which the data to be subjected to the job is stored as the data file and job information for executing a predetermined procedure with respect to the data file is stored as a job file, comprising:

portable storage medium access means for accessing the portable storage medium storing the data and the job information to read out contents of the data file to be subjected to the job and the job file;

image formtion means for printing out the visible image based on the data in the data file to be subjected to the job onto a recording medium; and job number reduction confirmation means for, when a user instructs to stop printing before the image formation means finishes the printing of a number of copies designated by the job information, making the user confirm whether or not to reduce a number of copies defined by the number of jobs where printing normally has been conducted from the designated number of copies.

* * * * *